US012553369B1

(12) United States Patent
Chen

(10) Patent No.: US 12,553,369 B1
(45) Date of Patent: Feb. 17, 2026

(54) PORTABLE OIL EXTRACTION PUMP

(71) Applicant: STAR SMART LIMITED, Hongkong (HK)

(72) Inventor: Zhijie Chen, Guangdong (CN)

(73) Assignee: STAR SMART LIMITED, Hongkong (HK)

( * ) Notice: Subject to any disclaimer, the term of this patent is extended or adjusted under 35 U.S.C. 154(b) by 0 days.

(21) Appl. No.: 19/214,511

(22) Filed: May 21, 2025

(30) Foreign Application Priority Data

Apr. 23, 2025 (CN) ......................... 202520781380.0
Apr. 23, 2025 (CN) ......................... 202520781427.3
Apr. 23, 2025 (CN) ......................... 202520781454.0
Apr. 23, 2025 (CN) ......................... 202520785126.8

(51) Int. Cl.
*F01M 11/04* (2006.01)
*F16N 37/00* (2006.01)

(52) U.S. Cl.
CPC ......... *F01M 11/0458* (2013.01); *F16N 37/00* (2013.01)

(58) Field of Classification Search
CPC ................. F01M 11/0458; F16N 37/00; F16N 2037/006; B67D 7/002; B67D 7/62; B67D 7/645; B67D 7/0205; B67D 2007/0419; F04D 27/009; F04D 29/08; F04D 13/06
See application file for complete search history.

(56) References Cited

U.S. PATENT DOCUMENTS

| | | | | |
|---|---|---|---|---|
| 7,121,433 B2 * | 10/2006 | Nelson | F04D 13/024 417/420 |
| 11,326,614 B2 * | 5/2022 | Park | F04D 29/086 |
| 11,898,697 B1 * | 2/2024 | Park | F16N 37/00 |
| 12,319,559 B1 * | 6/2025 | Lai | B67D 7/62 |
| 2015/0224524 A1 * | 8/2015 | Roide | B05B 7/2464 |
| 2021/0309505 A1 * | 10/2021 | Tetley | B67D 7/0205 |

* cited by examiner

*Primary Examiner* — Anna M Momper
*Assistant Examiner* — Mark K Buse

(57) ABSTRACT

A portable oil extraction pump includes a mainframe, an oil extraction tube, an oil outlet tube and a pump body configured in the oil extraction tube. A mainframe includes a control cavity and a first routing hole connected to the control cavity. The control cavity is configured with a circuit board and a battery electrically connected to the circuit board. The battery is configured to supply the power to the circuit board. The oil extraction tube is connected to the mainframe. A pump body is electrically connected to the circuit board through a wire. A first sealing member is configured between the oil extraction tube and the mainframe to prevent an oil from entering the control cavity, the first sealing member is a soft rubber. The wire passes through the first sealing member and the first routing hole.

17 Claims, 28 Drawing Sheets

PORTABLE OIL EXTRACTION PUMP

CROSS-REFERENCE TO RELATED APPLICATIONS

The application claims priorities of Chinese Patent Application No. CN2025207814273, filed on Apr. 23, 2025, Chinese Patent Application No.CN2025207851268, filed on Apr. 23, 2025, Chinese Patent Application No.CN2025207813800, filed on Apr. 23, 2025, and Chinese Patent Application No.CN2025207814540, filed on Apr. 23, 2025, the entire contents of which are incorporated herein by reference.

TECHNICAL FIELD

The present invention relates to an oil extraction pump, in particular to a portable oil extraction pump.

BACKGROUND

As we all know, a portable oil extraction pump is an electronic product which is portable for users to use and used to pump gasoline, diesel and other oils from one container to another. The portable oil extraction pump includes a mainframe, an oil extraction tube and an oil outlet tube, wherein the mainframe includes a circuit board, the oil extraction tube includes a pump body, the pump body and the circuit board are electrically connected by a wire. The cavity inside the mainframe for installing the circuit board and the oil extraction tube is in sealing state. The sidewall of the cavity is provided with a routing hole for the power supply line to pass through. At present, the existing sealing structure between the cavity for mounting the circuit board and the oil extraction tube is generally sealed by gluing between the routing hole and the wire. However, the sealing by gluing, the gluing of the gel is easy to harden over time. During the vibration process of the pump body when pumping water, the gluing of the gel is easy to loosen, resulting in the poor sealing effect of the cavity for mounting the circuit board.

SUMMARY

The present invention provides a portable oil extraction pump, to solve the problem that the wire routing between the cavity for installing the circuit board and the oil extraction tube of the existing portable oil extraction pump is sealed by glue, and the glue is easy to loosen.

In order to solve the technical problem, the technical scheme provided by the present invention is as follows.

A portable oil extraction pump includes a mainframe, an oil extraction tube, a pump body and an oil outlet tube.

The mainframe includes a control cavity and a first routing hole connected to the control cavity which a circuit board and a battery electrically connected to the circuit board are configured in the control cavity.

The oil extraction tube is connected to the mainframe.

The pump body is configured in the oil extraction tube.

The pump body is connected to the circuit board through a wire, a first sealing member is configured between the oil extraction tube and the mainframe to prevent an oil from entering the control cavity, the material of the first sealing member is a rubber, the wire passes through the first sealing member and the first routing hole and is electrically connected to the circuit board, the wire is connected with the first sealing member and/or the first routing hole through an interference fit.

The oil outlet tube is connected with the oil extraction tube, when the pump body is driven, the oil is pumped through the oil extraction tube and output through the oil outlet tube.

The present invention has the following beneficial effects. Compared with the prior art, in this present invention, the first sealing member is arranged between the mainframe and the oil extraction tube, and the material of the first sealing member is the rubber. The first sealing member can be effectively fixed by squeezing between the mainframe and the oil extraction tube. The wire passes through the first sealing member and the first routing hole and is connected with the first sealing member and/or the first routing hole through the interference fit. Thereby effectively isolating the control cavity from the oil extraction tube and preventing the first sealing member from falling off the wire when the portable oil extraction pump of this embodiment is used for a long time, effectively increasing the airtightness service life of the control cavity.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

DESCRIPTION OF EMBODIMENTS

Figure 1:
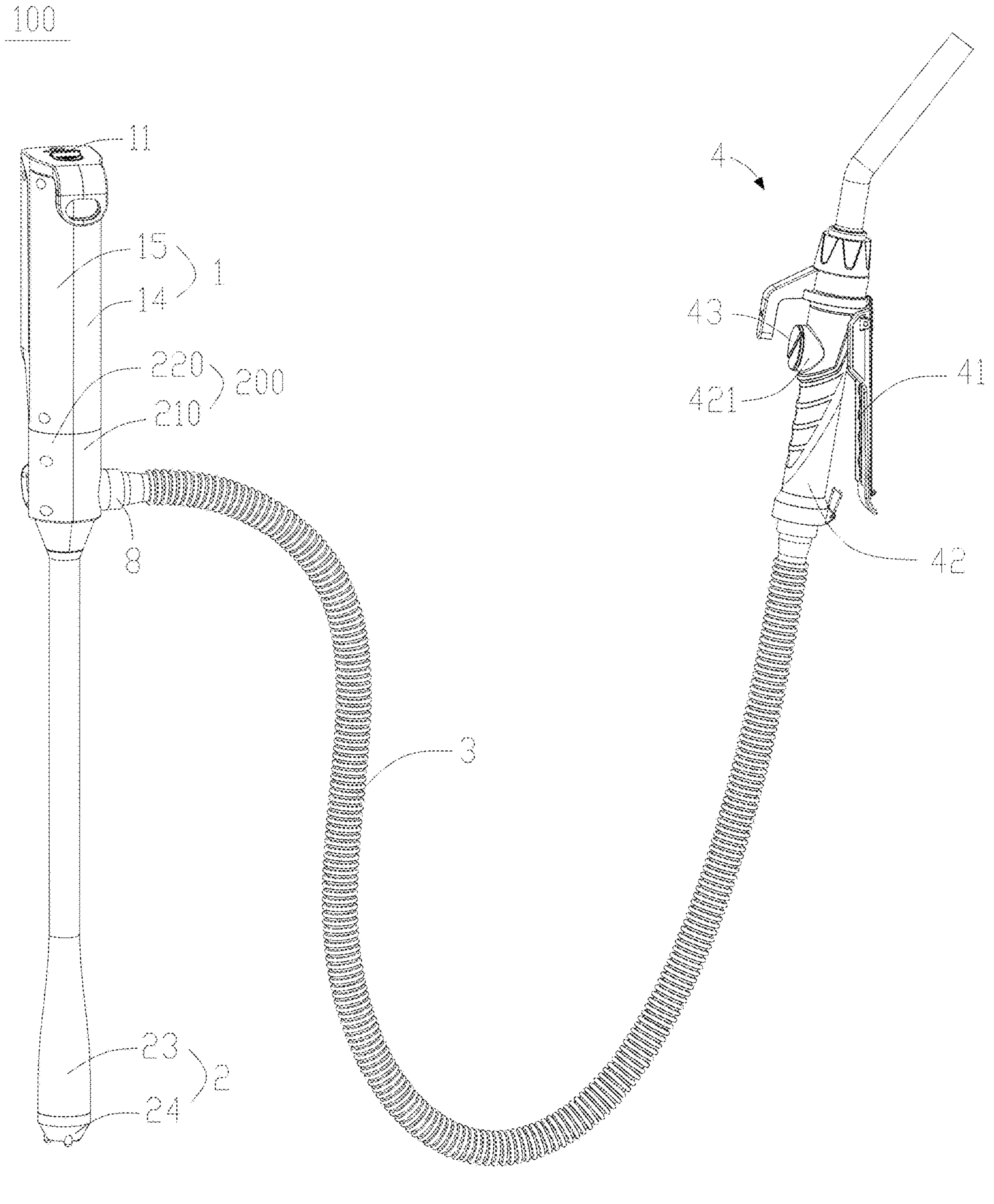
FIG. 1 is an isometric view of the present invention.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Referring to FIG. 1 to FIG. 29, the present invention provides a portable oil extraction pump 100.

Referring to FIG. 1 to FIG. 11, the portable oil extraction pump 100 includes a mainframe 1, an oil extraction tube 2, an oil outlet tube 3 and a pump body 5 configured in the oil extraction tube 2. The mainframe 1 includes a control cavity 10 and a first routing hole 102 connected to the control cavity 10 which a circuit board 7 and a battery 6 electrically connected to the circuit board 7 are configured in the control cavity 10, the battery 6 is configured to supply power to the circuit board 7. The oil extraction tube 2 is connected to the mainframe 1. The pump body 5 is connected to the circuit board 7 through a wire 50. A first sealing member 9 is configured between the oil extraction tube 2 and the mainframe 1 to prevent an oil from entering the control cavity 10. The material of the first sealing member 9 is a rubber. The wire 50 passes through the first sealing member 9 and the first routing hole 102 and is electrically connected to the circuit board 7. The wire 50 is connected with the first sealing member 9 and/or the first routing hole 102 through an interference fit. The oil outlet tube 3 is connected with the oil extraction tube 2. When the pump body 5 is driven, the oil is pumped through the oil extraction tube 2 and output through the oil outlet tube 3.

In this embodiment, the first sealing member 9 is arranged between the mainframe 1 and the oil extraction tube 2, and the material of the first sealing member 9 is the rubber. The first sealing member 9 can be effectively fixed by squeezing between the mainframe 1 and the oil extraction tube 2. The wire 50 passes through the first sealing member 9 and the first routing hole 102 and is connected with the first sealing member 9 and/or the first routing hole 102 through the interference fit. Thereby effectively isolating the control cavity 10 from the oil extraction tube 2 and preventing the first sealing member 9 from falling off the wire 50 when the portable oil extraction pump 100 of this embodiment is used for a long time, effectively increasing the airtightness service life of the control cavity 10. Thereby solving the problem that the existing oil extraction pump 100 uses the glue injection between the wire 50 and the routing hole, which causes the glue to easily fall off.

In this embodiment, the first sealing member 9 includes a first embedment block 92 and a limiting block 91 formed by extending outward from the first embedment block 92. The limiting block 91 is located between the oil extraction tube 2 and the mainframe, thereby fixing the first sealing member 9, preventing oil from entering the control cavity 10 through a gap between the oil extraction tube 2 and the mainframe 1.

One end close to the circuit board 7 of the oil extraction tube 2 is provided with a first embedment groove 232. The oil extraction tube 2 is provided with a second routing hole 25 which is connected to an inside of the oil extraction tube 2 and the first embedment groove 232 respectively. The first embedment block 92 is disposed in the first embedment groove 232. The wire 50 passes through the second routing hole 25, the first embedment block 92 and the limiting block 91. The first embedment groove 232 is configured to limit the first embedment block 92 and position the first sealing member. The first limiting block 91 is placed between the oil extraction tube 2 and the mainframe 1, which is convenient for the installation of the first sealing member 9 and increase the contact area between the first sealing member 9 and the oil extraction tube 2, further improving the airtightness between the first sealing member 9 and the oil extraction tube 2.

In this embodiment, the first sealing member 9 further includes a second embedment block 93, the second embedment block 93 is connected to a surface of the first embedment block 92 opposite to the limiting block 91. The wire 50 passes through the second embedment block 93. The second embedment block 93 is disposed in the second routing hole 25, further increasing the contact area between the first sealing member 9 and the oil extraction tube 2.

In this embodiment, the cross sections of the second embedment block 93, the first embedment block 92 and the limiting block 91 decrease in sequence. The second embedment block 93, the first embedment block 92 and the limiting block 91 are stepped. Therefore, the control cavity 10 is effectively isolated with an interior of the oil extraction tube 2, ensuring the airtightness of the control cavity 10 and the interior of the oil extraction tube 2, preventing oil from entering the control cavity 10 and causing safety hazard.

In this embodiment, the wire 50 is connected with one or more of the second embedment block 93, the first embedment block 92 and the limit block 91 through the interference fit, thereby increasing the contact area between the wire 50 and the first sealing member 9, an improving the airtightness of the control cavity 10 and the interior of the oil extraction tube 2.

Specifically, in the above embodiment, the second embedment block 93 is connected with a sidewall of the second routing hole 25 through the interference fit. A surface close to the second embedment block 93 of the first embedment block 92 is connection to a bottom surface the first embedment groove 232. The two opposite surfaces of the limiting block 91 are respectively connected with the mainframe 1 and the oil extraction tube 2. And/Or, an outer sidewall of the first embedment block 92 is connected with the first embedment groove 232 through the interference fit, further improving the airtightness of the control cavity 10, and preventing the oil from entering the control cavity 10 and causing the safety hazard.

Figure 8:
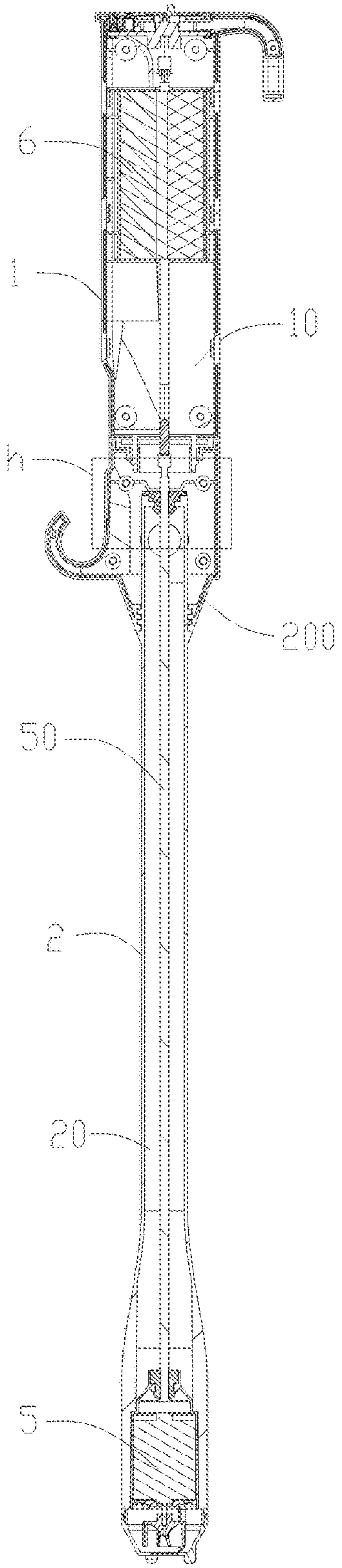
FIG. 8 is a cross-sectional view of another embodiment along the centerline of the oil extraction tube after removing an oil outlet tube and a control handle of the present invention.
Figure 9:
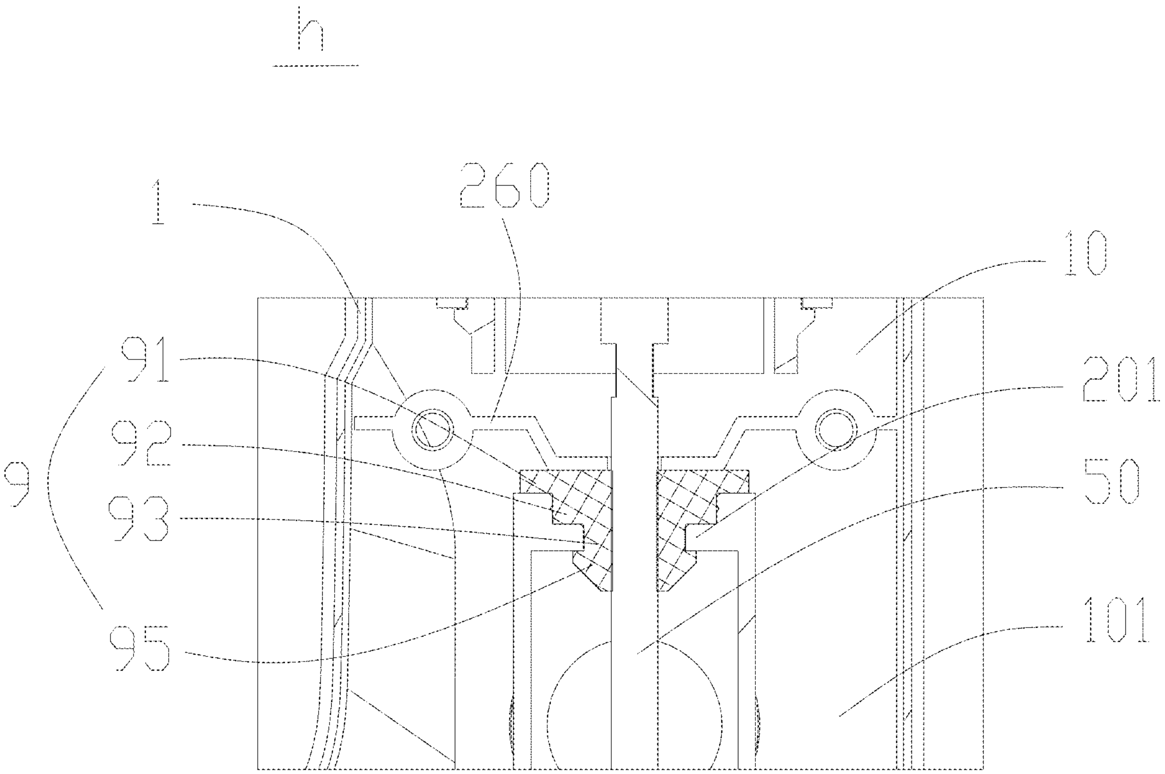
FIG. 9 is an enlarged schematic view of region h in FIG. 8.
Figure 10:
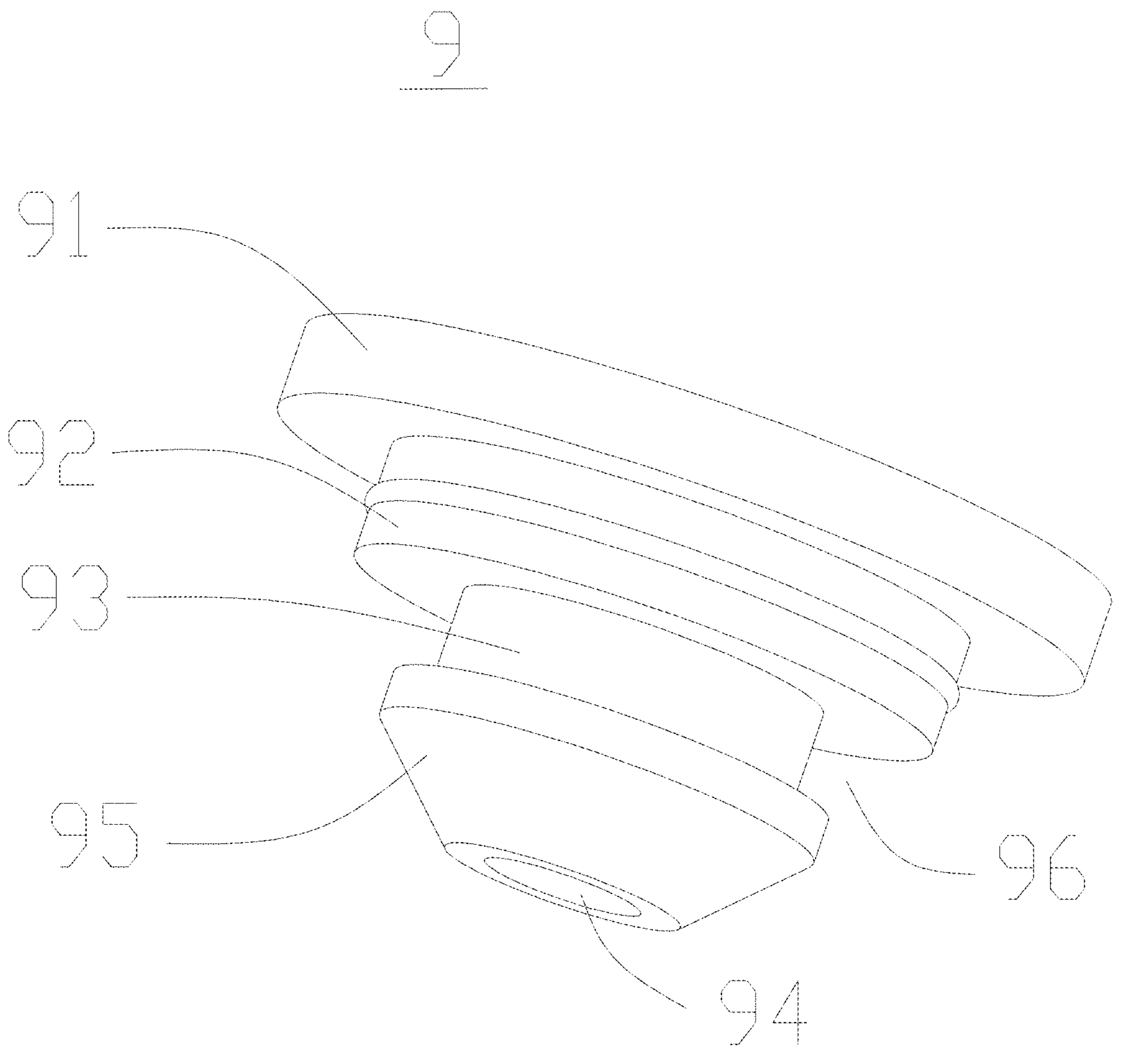
FIG. 10 is a schematic diagram of a first sealing member of another embodiment of the present invention.
Figure 11:
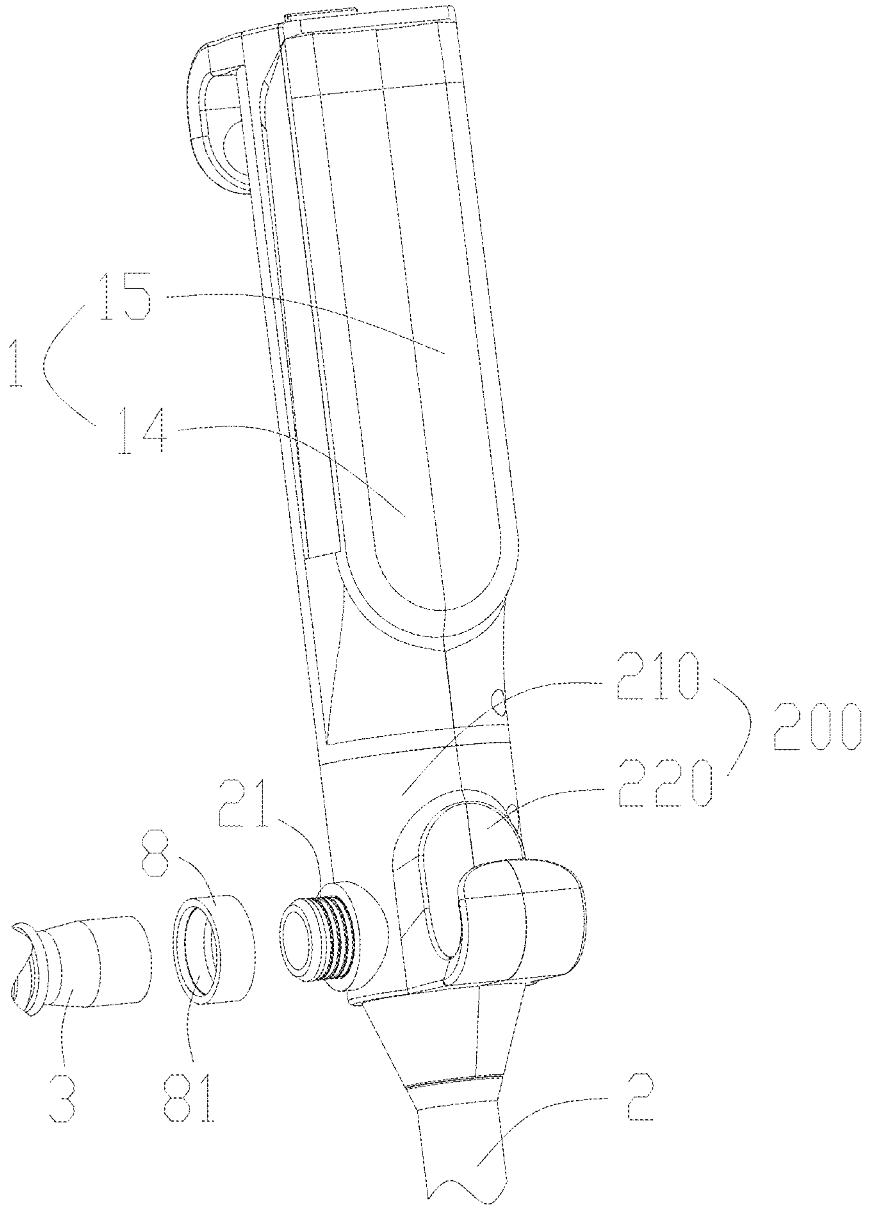
FIG. 11 is an exploded view of the oil extraction tube, an adapter member and a mainframe integrally assembled and in relation to a first hold-down member and the oil outlet tube of the present invention.

In this embodiment, an inner sidewall of the oil extraction tube 2 is provided with a partition convex block 201, the second routing hole 25 is disposed on the partition convex block 201. One end of the second embedment block 93 is provided with a first fixture block 95 opposite to the first embedment block 92. A first fixture groove 96 is provided among the first fixture block 95, the first embedment block 92 and the second embedment block 93. The partition convex block 201 is disposed in the first fixture groove 96. Referring to FIG. 8 to FIG. 10, the first sealing member 9 is fixed to the oil extraction tube 2 by a clamp connection. Thereby the first sealing member 9 is fixed when the oil extraction tube 2 is connected to the mainframe 1, preventing the first sealing member 9 from falling. Specifically, the first fixture block 95 is located below the partition convex block 201, the cross section of the first fixture block 95 gradually decreases in a direction opposite to the limiting block 91, the first fixture block 95 passes through the second routing hole 25. Of course, in other embodiments, the first sealing member 9 may not be the above structure. The first fixture groove 96 is provided on a sidewall of the first sealing member 9, the second routing hole 25 is provided in the middle of the first sealing member 9. A cross section of the first sealing member 9 is I-shaped. The partition convex block 201 matching with the first fixture groove 96 is provided on the inner sidewall of the oil extraction tube 2. The first sealing member 9 passes through the second routing hole 25. The partition convex block 201 is disposed in the first fixture groove 96, realizing a fixing connection between the first sealing member 9 and the oil extraction tube 2.

In this embodiment, the mainframe 1 further includes an adapter cavity 101. One end of the oil extraction tube 2 is placed in the adapter cavity 101. The mainframe 1 is configured with a first separator plate 260 between the adapter cavity 101 and the control cavity 10. The wire passes through the first separator plate 260, the first routing hole 102 is disposed on one side of the first separator plate 260 opposite to the oil extraction tube 2, or the first routing hole 102 is provided on the first separator plate 260. The first sealing member 9 is at least partially located between the first separator plate 260 and the oil extraction tube 2. A junction structure 230 is located between the mainframe 1 and the oil extraction tube 2, the junction structure 230 is disposed at one end of the adapter cavity 101 opposite to the control cavity 10. In this way, the oil extraction tube 2 and the mainframel can be integrally assembled. The junction structure 230 is configured to locate a relative position between the oil extraction tube 2 and the mainframe 1, to realize that the first sealing member 9 is limited between the first separator plate 260 and the oil extraction tube 2.

Specifically, the junction structure 260 includes at least one embedment convex block 231 and a second embedment groove 142 matching with the embedment convex block 231, the embedment convex block 231 is disposed in the second embedment groove 142. Furthermore, the embedment convex block 231 is disposed on the mainframe 1, the second embedment groove 142 is disposed on the oil extraction tube 2. Or the embedment convex block 231 is disposed on the oil extraction tube 2, the second embedment groove 142 is disposed on the mainframe 1.

In this embodiment, the number of the embedment convex blocks 231 and the second embedment grooves 142 is one or multiple.

In this embodiment, the sidewall of the oil extraction tube 2 protrudes to form a connection tube 21. An avoidance hole 141 is provided on the mainframe 1 and connected to the adapter cavity 10, the connection tube 21 passes through the avoidance hole 141. The oil outlet tube 3 is connected with the connection tube 21. The connection tube 21 is configured to connect and communicate between the oil extraction tube 2 and the oil outlet tube 3.

In this embodiment, one end of the oil outlet tube 3 is sleeved on an outer side of the connection tube 21 and tightened through the first hold-down ring 8, improving the stability of the connection between the oil outlet tube 3 and the connection tube 21.

In this embodiment, an outer sidewall of the connection tube 21 is provided with a first locking groove 22. An inner sidewall of the first hold-down ring 8 is provided with a first hold-down convex 81 corresponding to the position of the first locking groove 22. The first hold-down convex 81 is connected with an outer sidewall of the oil outlet tube 3 through the interference fit, to press a portion of the oil outlet tube 3 into the first locking groove 22 and fix the oil outlet tube 3 on the connection tube 21.

Referring to FIG. 12 to FIG. 19, in this embodiment, the pump body 5 includes an oilproof cover 57, a motor 53 and an impeller 54 arranged in the oil extraction tube 2. An oil passage channel 206 for oil passing is formed between the oilproof cover 57 and the inner sidewall of the oil extraction tube 2. The motor 53 is arranged in the oilproof cover 57. A rotary shaft of the motor 53 passes through from the inside of the oilproof cover 57 and connects to the impeller 54, the impeller 54 is located close to one side of the oil extraction tube 2 opposite to the mainframe 1. The motor 53 is electrically connected to the circuit board 7 through the wire 50, one end of the wire 50 passes into the oilproof cover 57 from the inside of the oil extraction tube 2 and is electrically connected to the motor 53, another end of the wire 50 passes into the mainframe 1 from the inside of the oil extraction tube 2 and is electrically connected to the circuit board 7.

A sealing gasket 55 is located between a side close to the impeller 54 of the motor 53 and the oilproof cover 57, the rotary shaft of the motor 53 passes through the sealing gasket 55. A first glue layer 530 is arranged in the oilproof cover 57, the first glue layer 530 covers at an electrical connection between the wire 50 and the motor 53, and/or the wire 50 is connected with the oilproof cover 57 through the interference fit.

By configuring the oilproof cover 57 on an outside of the motor 53, the sealing gasket 55 is arranged between the position where the rotary shaft of the motor 53 passes through and the oilproof cover 57, preventing oil from entering the oilproof cover 57 through a gap between the rotary shaft of the motor 53 and the oilproof cover 57. In combination with the interference fit of the first glue layer 530 and/or the wire 50 and the oilproof cover 57, preventing the electrical connection between the motor 53 and the wire 50 from contacting the oil. The waterproof oilproof cover 57 can effectively alleviate the scouring force of the first glue layer 530 generated by the flow of oil when the pump body 5 pumps oil. In addition, the interference fit between the waterproof oilproof cover 57 and the wire 50, and the electrical connection between the wire 50 and the motor 53 can effectively prevent the wire 50 from being pulled when the oil flows, increasing the airtightness service life, to solve the problem of using glue to prevent oil between the wire 50 and the motor 53, but the oil-proof effect is short.

Furthermore, the oil passage channel 206 for oil passing is formed between the oilproof cover 57 and the inner sidewall of the oil extraction tube 2. By using the oil passage channel 206, when the circuit board 7 drives the motor 53 to work, the rotary shaft of the motor 53 rotates and drives the impeller 54 to rotate. The oil passes through an oil inlet 241 of the oil extraction tube 2 and the oil extraction tube 2 and is discharged through the oil outlet tube 3, to achieve the effect of pumping oil.

Furthermore, a third routing hole 514 is provided on the oilproof cover 57, the wire 50 passes through the third routing hole 514. The oilproof cover 57 includes a housing 52 and a housing cover 51 connected to the housing 52 to form a first mounting cavity 58. The motor 53 and the sealing gasket 55 are arranged in the first mounting cavity 58.

In this embodiment, to facilitate the connection of the housing 52 with the housing cover 51. An annular groove 521 is provided on an inner sidewall of the housing 52. The housing cover 51 extends outward to form an annular convex block 512 matching with the annular groove 521. The annular convex block 512 is placed in the annular groove 521. Of course, in other embodiments, the housing 52 and the housing cover 51 are connected by threads, interference fit, clamps, etc.

Figure 2:
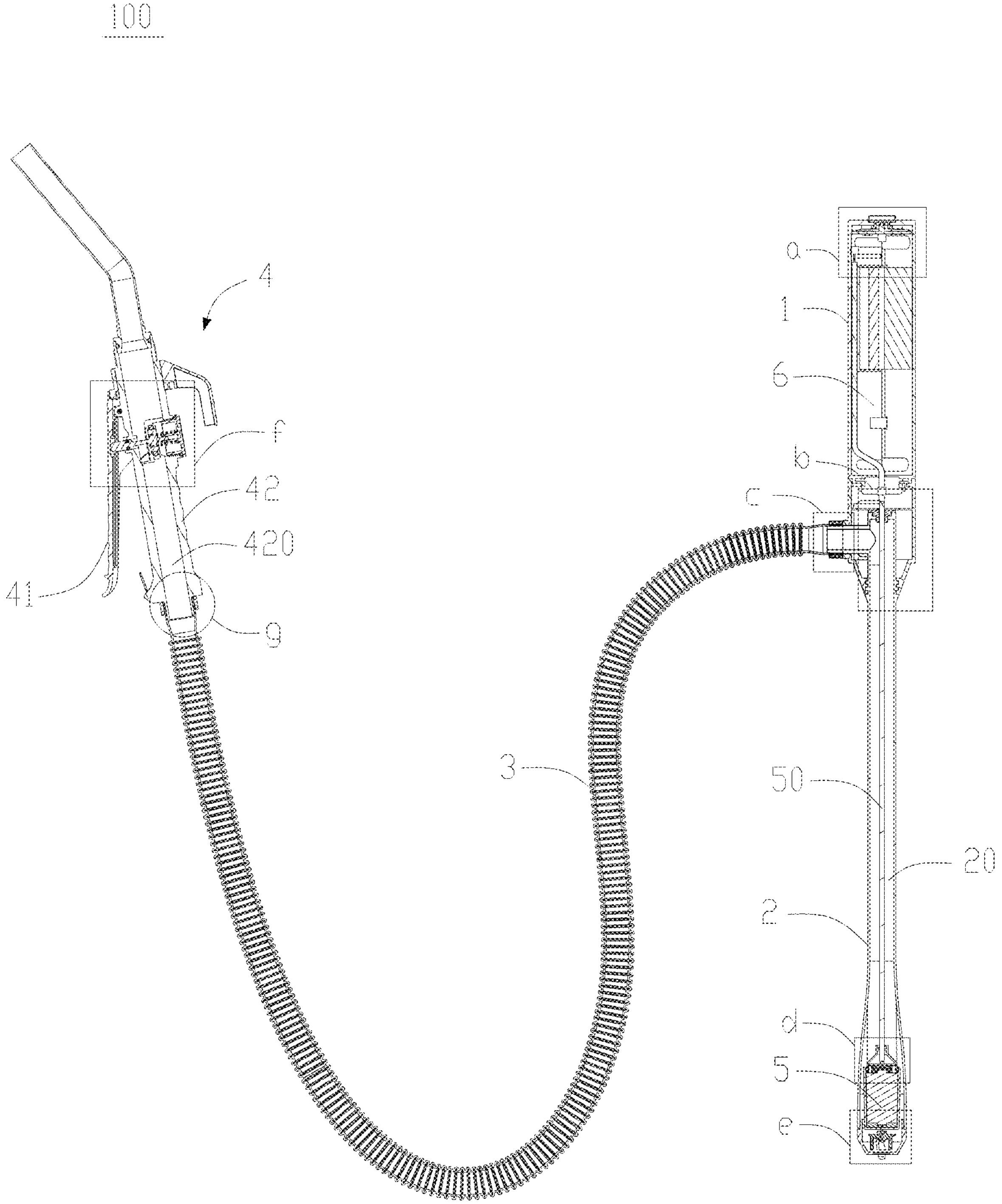
FIG. 2 is a cross-sectional view along the centerline of an oil extraction tube of the present invention.
Figure 3:
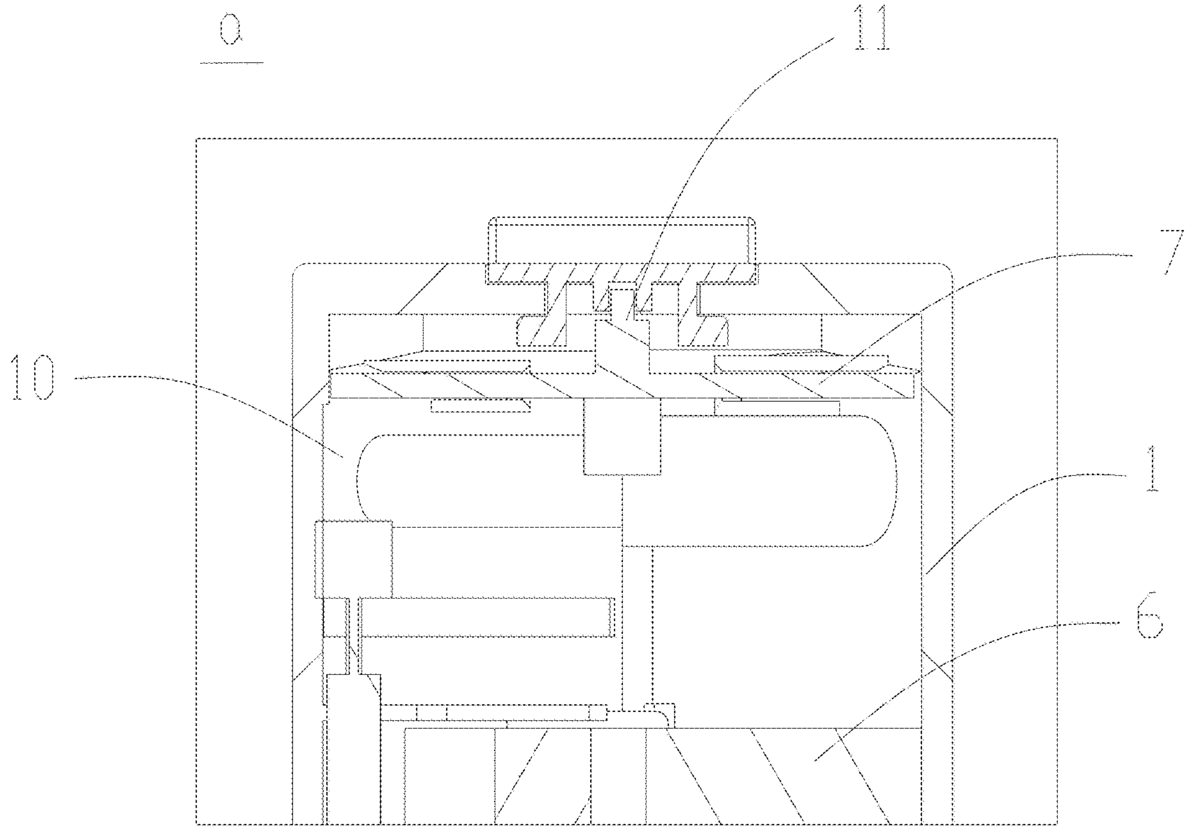
FIG. 3 is an enlarged schematic view of region a in FIG. 2.
Figure 4:
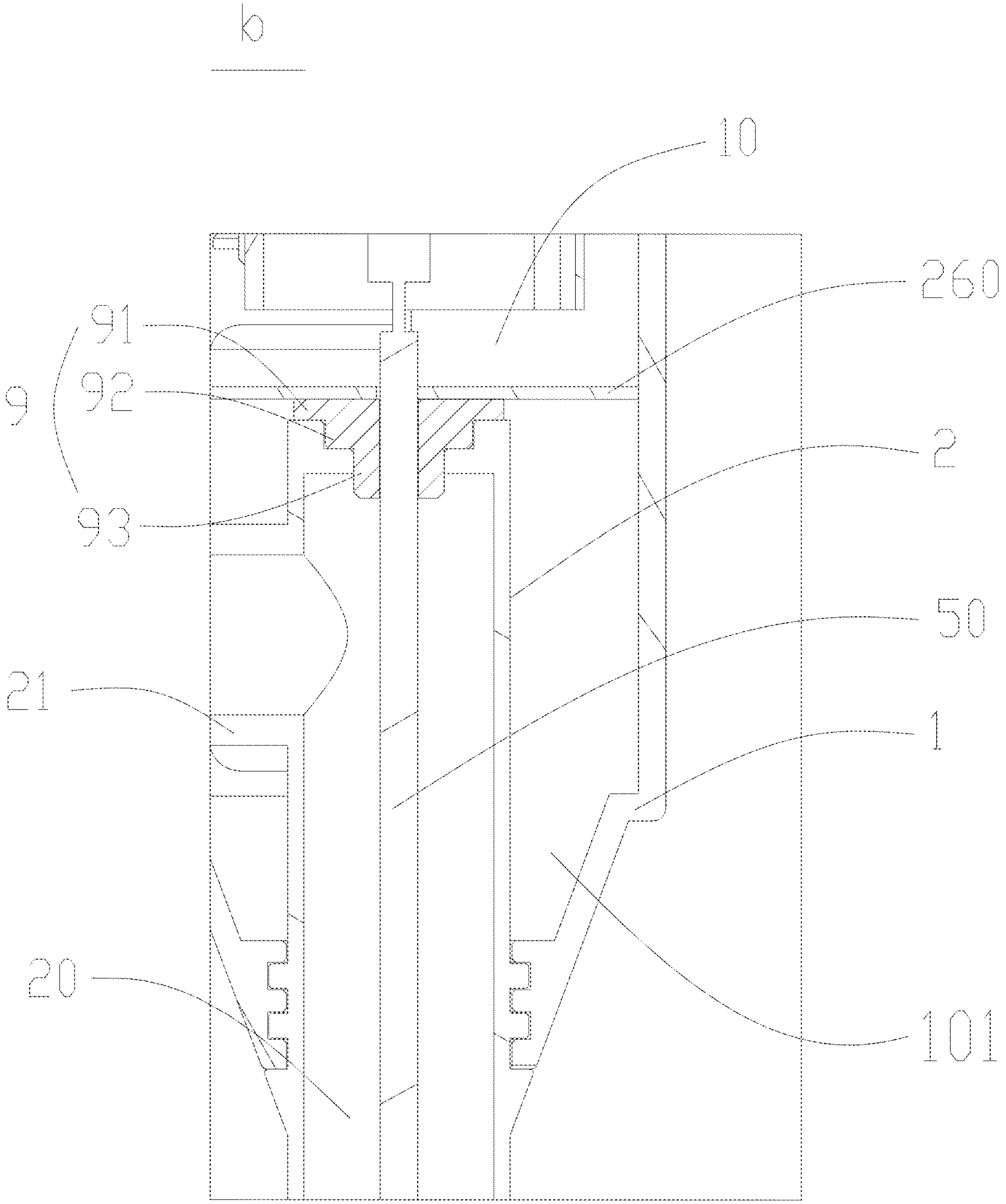
FIG. 4 is an enlarged schematic view of region b in FIG. 2.
Figure 5:
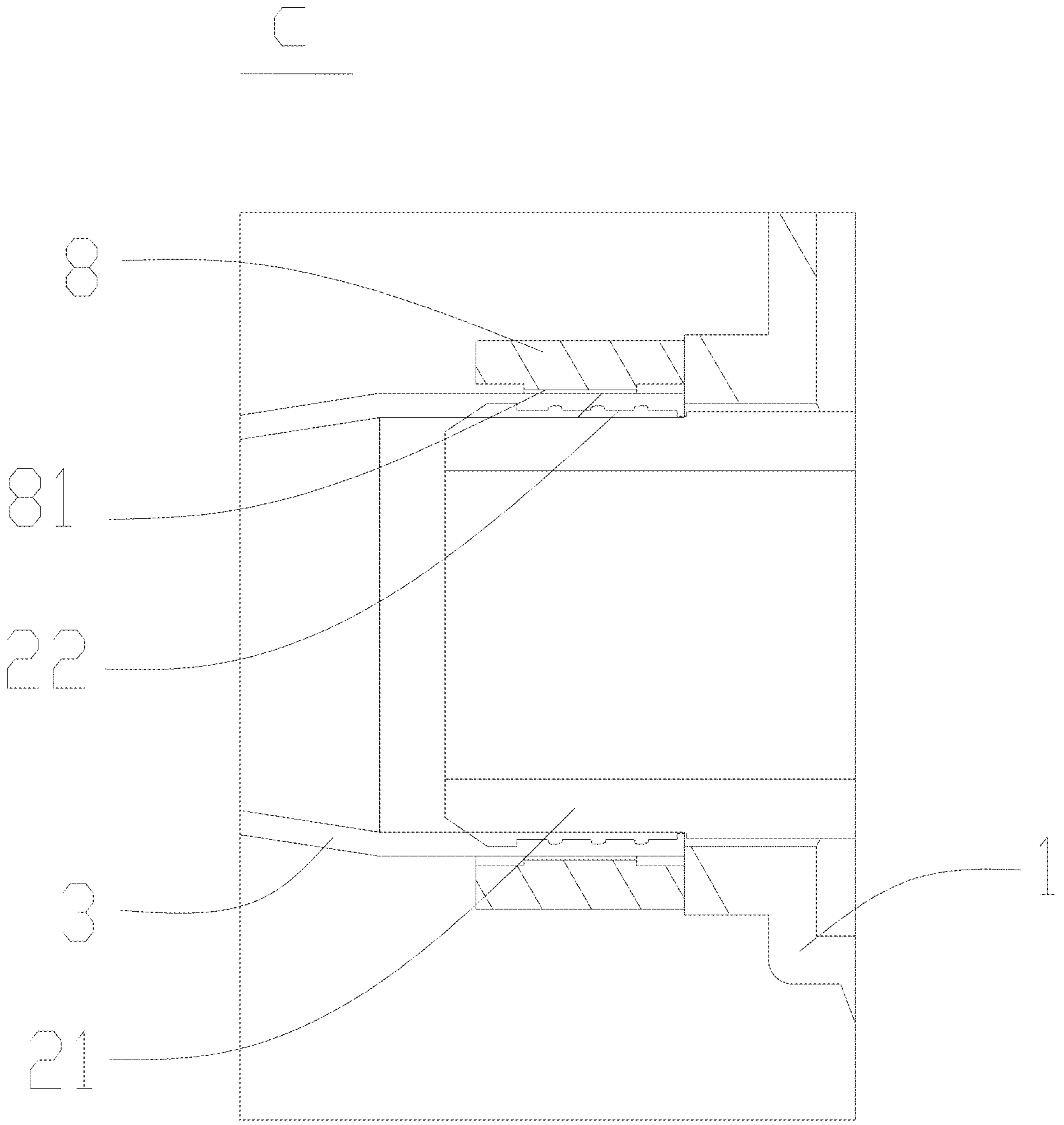
FIG. 5 is an enlarged schematic view of region c in FIG. 2.
Figure 6:
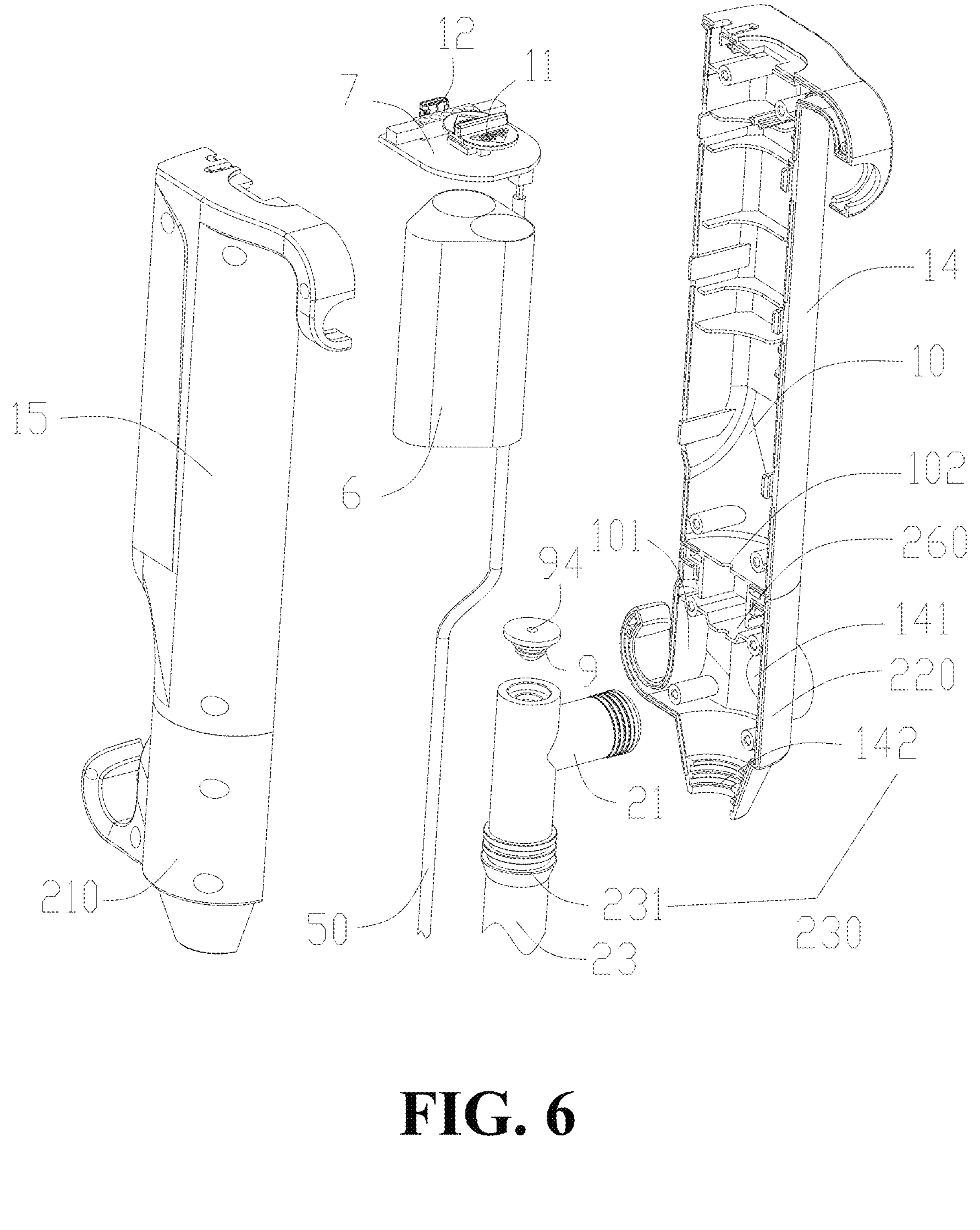
FIG. 6 is a partially exploded view of the present invention.
Figure 7:
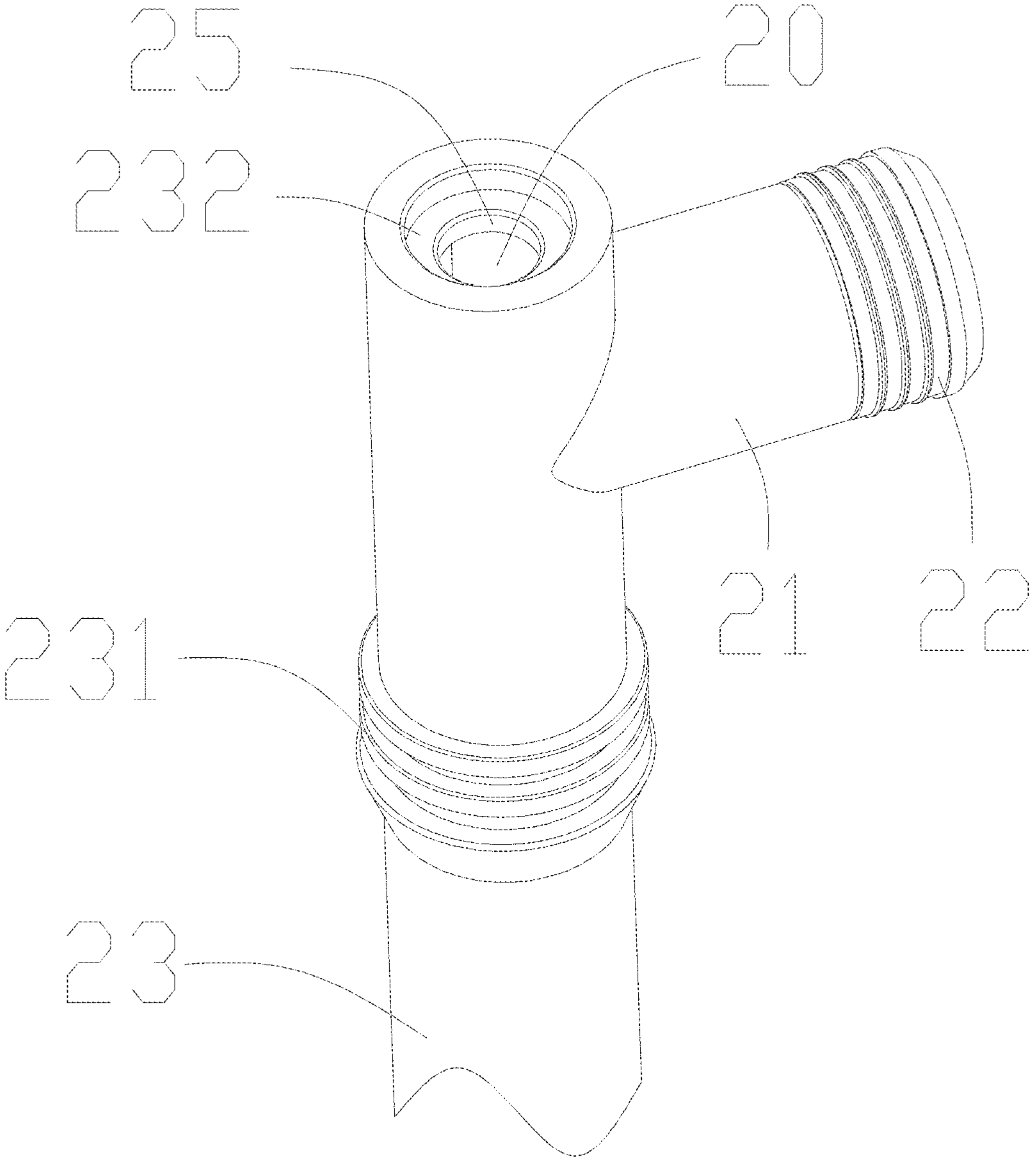
FIG. 7 is a partial structural view of the oil extraction tube of the present invention.
Figure 12:
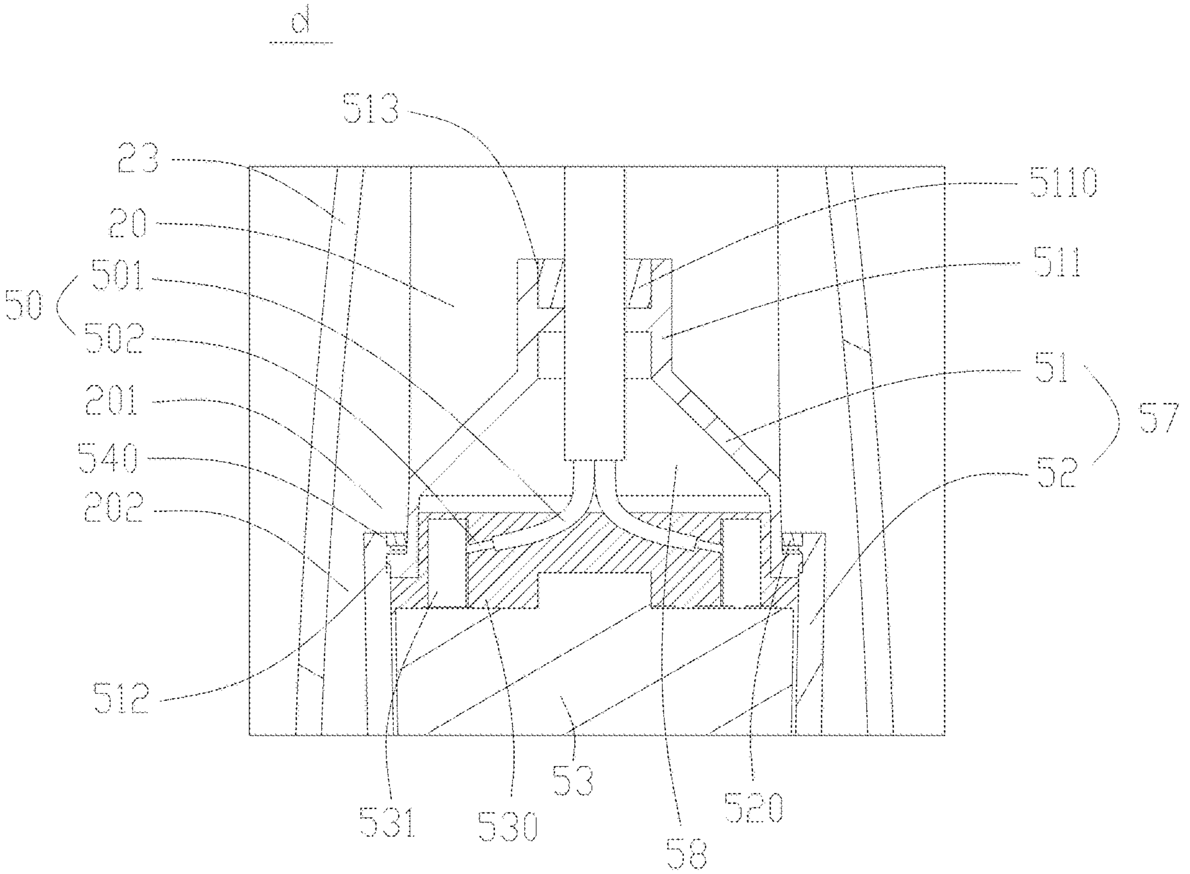
FIG. 12 is an enlarged schematic view of region d in FIG. 2.
Figure 13:
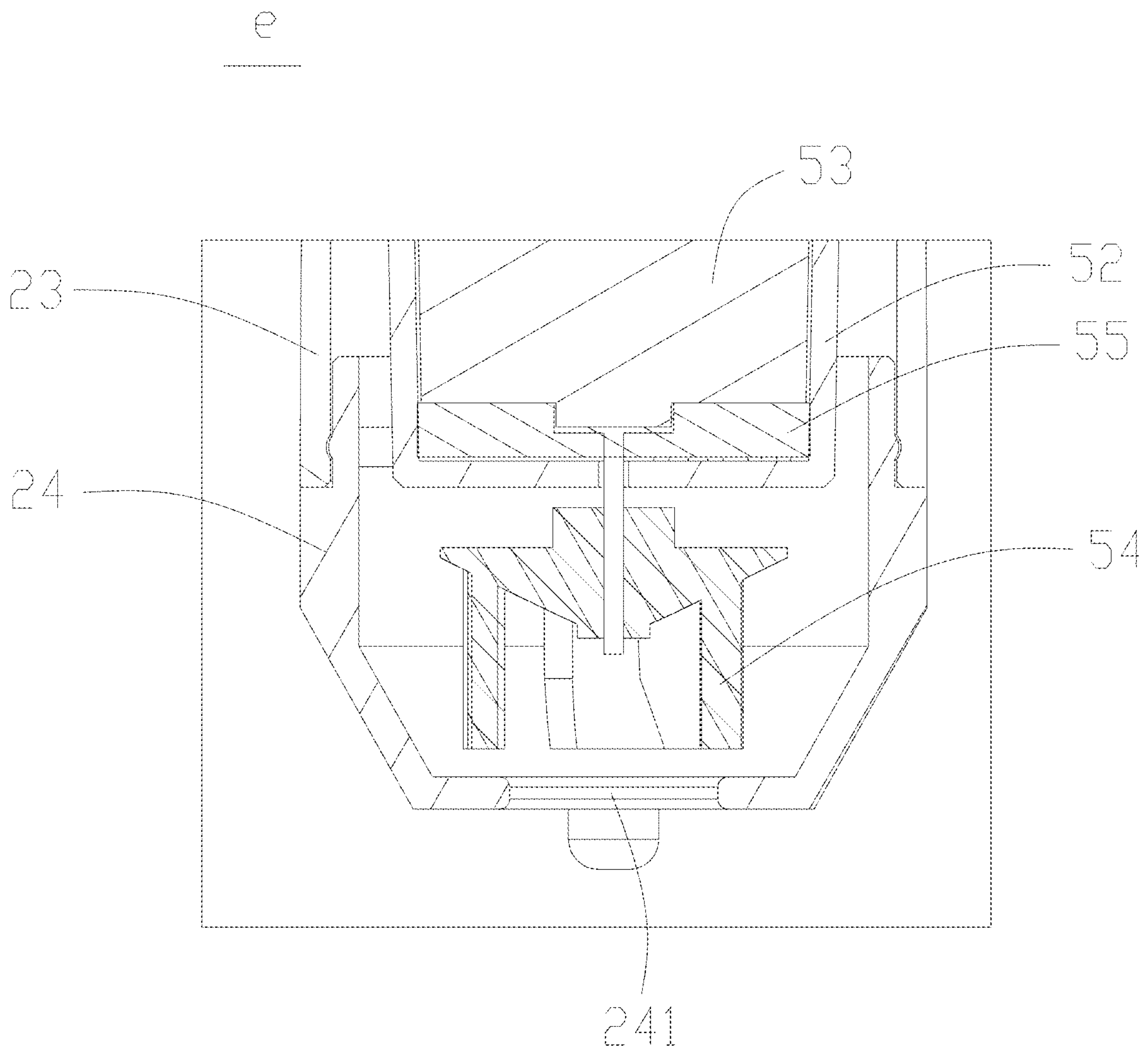
FIG. 13 is an enlarged schematic view of region e in FIG. 2.
Figure 14:
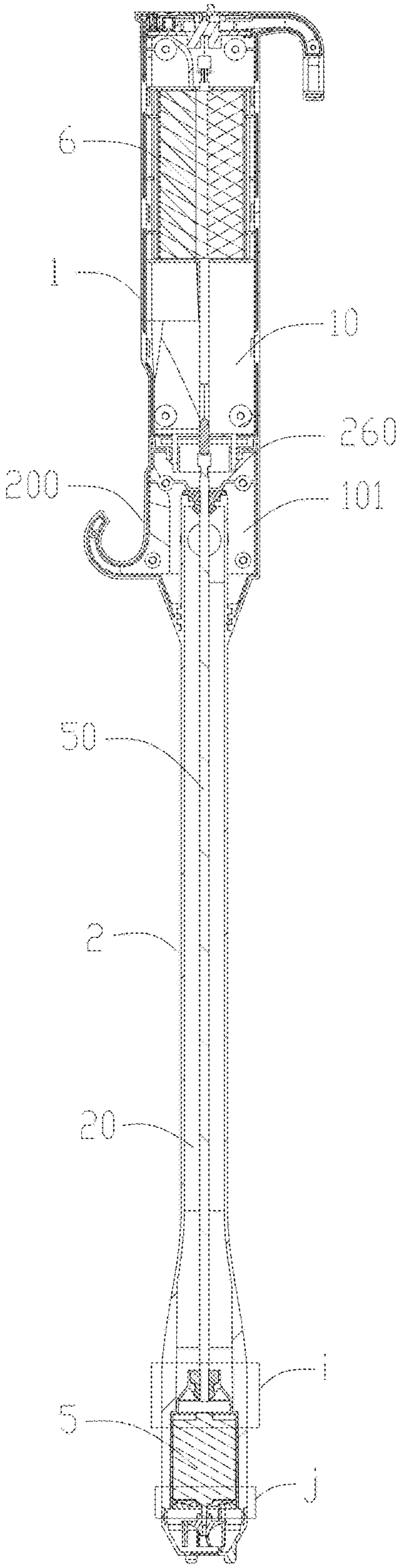
FIG. 14 is a cross-sectional view of another embodiment along the centerline of the oil extraction tube after removing the oil outlet tube and the control handle of the present invention.
Figure 15:
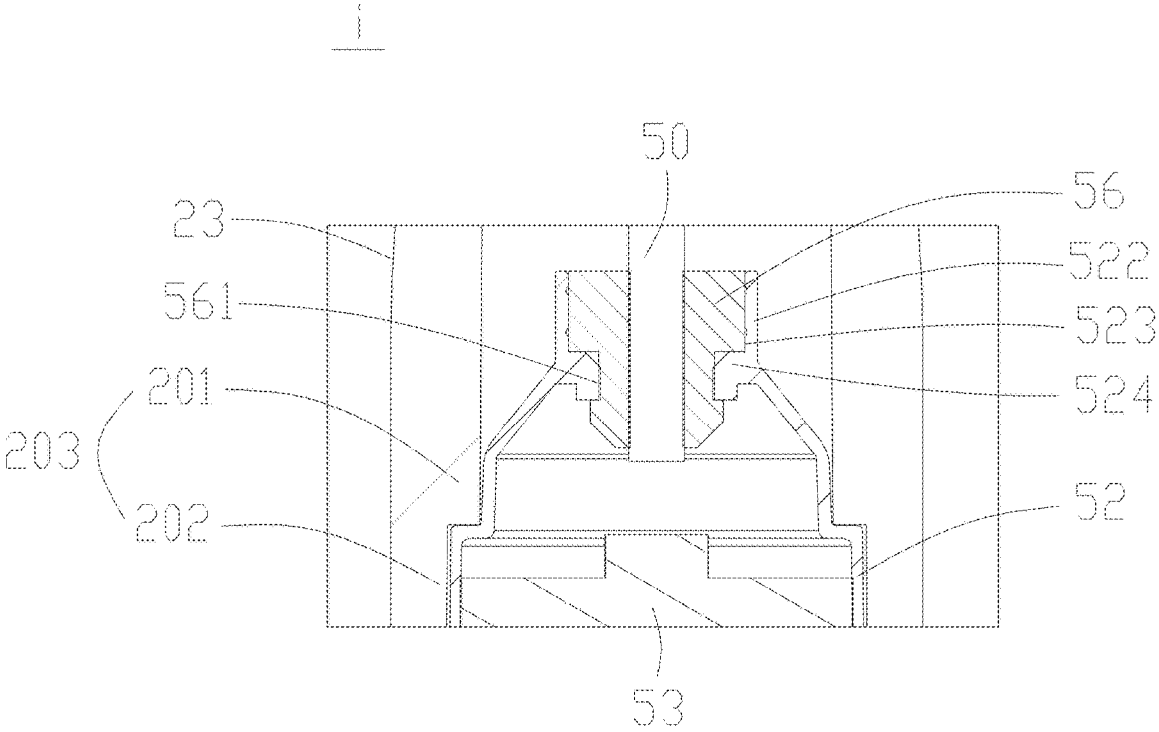
FIG. 15 is an enlarged schematic view of region i in FIG. 14.
Figure 16:
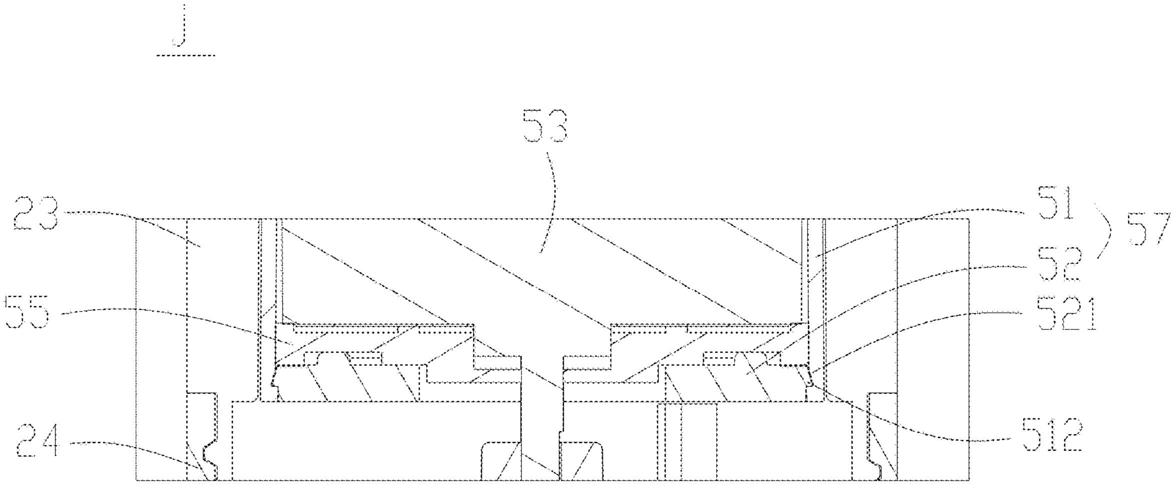
FIG. 16 is an enlarged schematic view of region j in FIG. 14.
Figure 17:
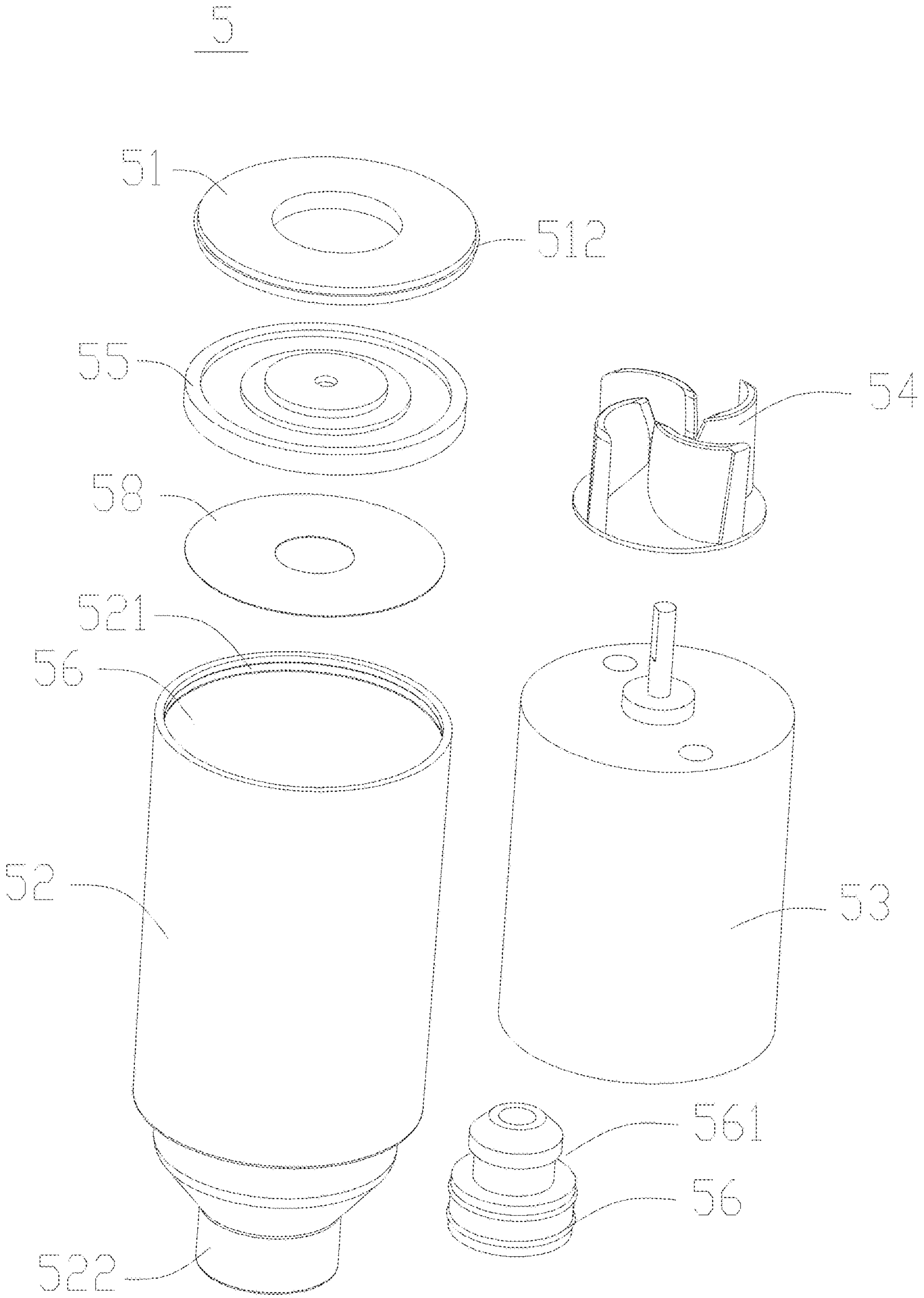
FIG. 17 is an exploded view of a pump body of another embodiment of the present invention.
Figure 18:
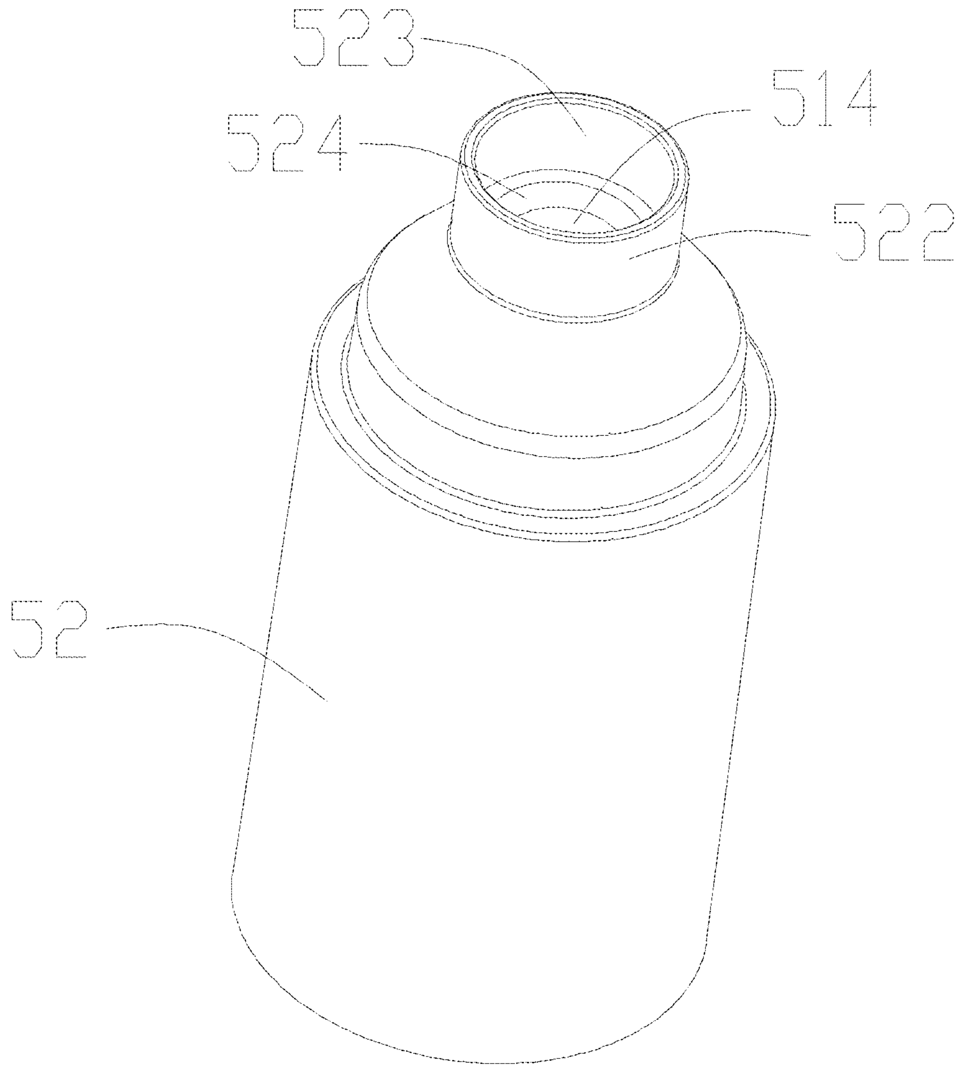
FIG. 18 is an isometric view of a housing of another embodiment of the present invention.

Referring to FIG. 2, FIG. 12 and FIG. 13, in this embodiment, the sealing gasket 55 is located on one side of the motor 53 opposite to the housing cover 51. The housing cover 51 is located on the motor 53 close to the mainframe 1. The rotary shaft of the motor 53 passes through the housing 52, the third routing hole 514 is provided on the housing cover 51. With the interference fit among the first glue layer 530 and/or the wire 50 and the oilproof cover, the sealing of the electrical connection between the motor 53 and the wires 50 can be ensured, avoiding the problem that the motor 53 and the electrical connection between the wire 50 and the motor 53 contact with the oil causing a safety hazard.

Furthermore, the housing cover 51 is connected with the housing 52 further forming a first glue-filled groove 540. The first glue-filled groove 540 is disposed at one side of the annular convex block 512 opposite to the first mounting cavity 58. The first glue-filled groove 540 is configured to fill with a second glue layer 540. The second glue layer 520 is formed by pouring the glue into the first glue-filled groove 540 after solidifying. Thereby, filling a gap between an outer wall of the housing cover 51 and an inner wall of the housing 52, sealing the gap between the outer wall of the housing cover 51 and the inner wall of the housing 52, preventing oil from entering the gap between the outer wall of the housing cover 51 and the inner wall of the housing 52.

Furthermore, the motor 53 is provided with a terminal block 531. The wire 50 includes a conductive core 504 and an insulation layer 503 wrapped on an outer wall of the conductive core 504. The terminal block 531 is electrically connected to the conductive core 504. A thickness of the first glue layer 530 at least covers the terminal block 531 and the conductive core 504 protruding from one end of the insulation layer 503 to prevent the conductive position from contacting with oil. The interference fit among the wire 50, a sidewall of the third routing hole 514 and/or the second glue layer 520 can effectively prevent the motor 53 and the electrical connection between the motor 53 and the wire 50 from contacting with oil, thereby playing an oil-proof role. Specifically, the conductive core 504 is made of copper.

Furthermore, the housing cover 51 protrudes outward at the position corresponding to the wire 50 to form a glue-filled convex 511. The third routing hole 514 passes through the glue-filled convex 511. One side of the glue-filled convex 511 opposite to the first mounting cavity 58 is provided with a second glue-filled groove 513 connected with the third routing hole 514. The second glue-filled groove 513 is configured to fill with a third glue layer 5110. The third glue layer 5110 is formed by pouring the glue into the second glue-filled groove 540. Thereby, sealing a gap between the wire 50 and the sidewall of the third routing hole 514, preventing oil from entering the oilproof cover 57 through the gap between the wire 50 and the sidewall of the third routing hole 514.

Referring to FIG. 14 to FIG. 18, in this embodiment, the housing cover 51 is located on or close to a bottom of the housing 52. The sealing gasket 55 is located on the side of the motor 53 close to the housing cover 51. The rotary shaft of the motor 53 passes through the housing cover 51. The third routing hole is provided on the housing 52.

In this embodiment, the oilproof cover 57 further includes a second sealing member 56. A top of the housing 52 includes a first convex wall 522 and a receiving groove 523 located in the first convex wall 522. The third routing hole 514 is connected with the receiving groove 523. The housing 52 includes a second fixture block 524 located between the receiving groove 523 and the first mounting cavity 58. An outer sidewall of the second sealing member 56 is provided with a second fixture groove 561. The second sealing member 56 passes through the third routing hole 514. The second fixture block 524 is disposed in the second fixture groove 561, a portion of the second sealing member 56 is disposed in the receiving groove 523. The wire 50 passes through the second sealing member 56 through the interference fit. The second sealing member 56 is connected with one or more of a sidewall of the receiving groove 523 and the sidewall of the third routing hole through 514 the interference fit, to achieve the sealing between the wire 50 and the housing 52. An upper surface and a lower surface of the sealing gasket 55 are respectively connected with the housing cover 51 and the motor 53, an outer wall of the sealing gasket 55 is connected with the housing 52 through interference fit, to achieve sealing of the oilproof cover 57.

In this embodiment, the inner sidewall of the oil extraction tube 2 protrudes and forms at least two limiting ribs 203 arranged at intervals. The oilproof cover 57 is connected with the limiting ribs 230 through interface fit. The oil passage channel 206 is formed among the oilproof cover 57, the limiting ribs 203 and the inner sidewall of the oil extraction tube 2. The inner sidewall of the oil extraction tube 2 is separated from an outer sidewall of the oilproof cover 57 through the limiting ribs 203 to form the oil passage channel 206, when the motor 53 drives the impeller 54 to rotate, the oil firstly passes through the oil inlet 241 of the oil extraction tube 2, secondly passes through the oil passage channel 206, finally passes through the oil extraction tube 2 and output from the oil outlet tube 3.

Specifically, each of limiting ribs 203 includes a first convex stripe 201 and a second convex stripe 202 connected with the first convex stripe 201. The second convex stripe 202 and the first convex stripe 201 are stepped, the second convex stripe 202 is located below the first convex stripe 201. A plurality of the second convex stripes 202 are arranged around to form a second mounting cavity 205. The oilproof cover 57 is placed in the second mounting cavity 205. The oilproof cover 57 is limited by the first convex strip 201, configuring to limit the relative position of the oilproof cover 57 and the oil extraction tube 2.

In this embodiment, one end of the first convex strip 201 opposite to the first convex strip 201 forms a guide surface 204. The guide surface 204 is an inclined surface and/or a curved surface. The oilproof cover 57 is configured in the second mounting cavity 205 for the product assembly.

Figure 19:
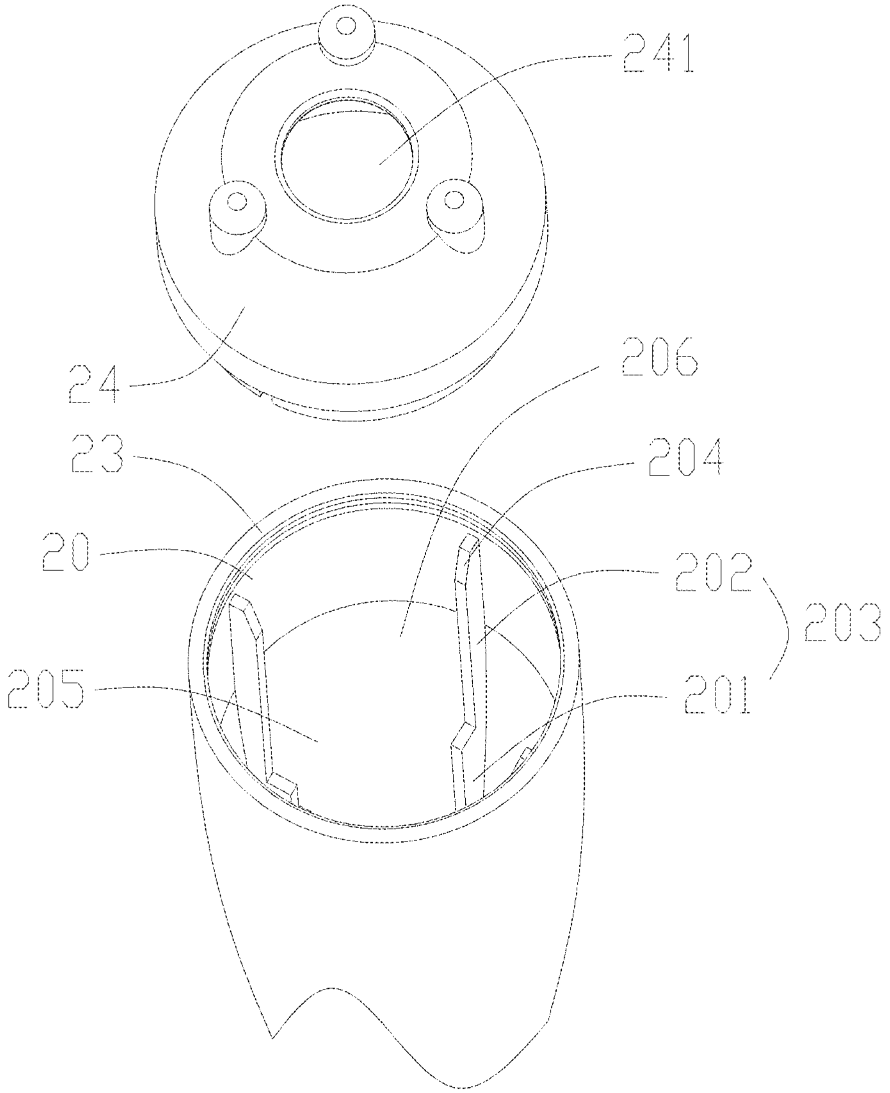
FIG. 19 is an exploded view of the oil extraction tube of the present invention.
Figure 20:
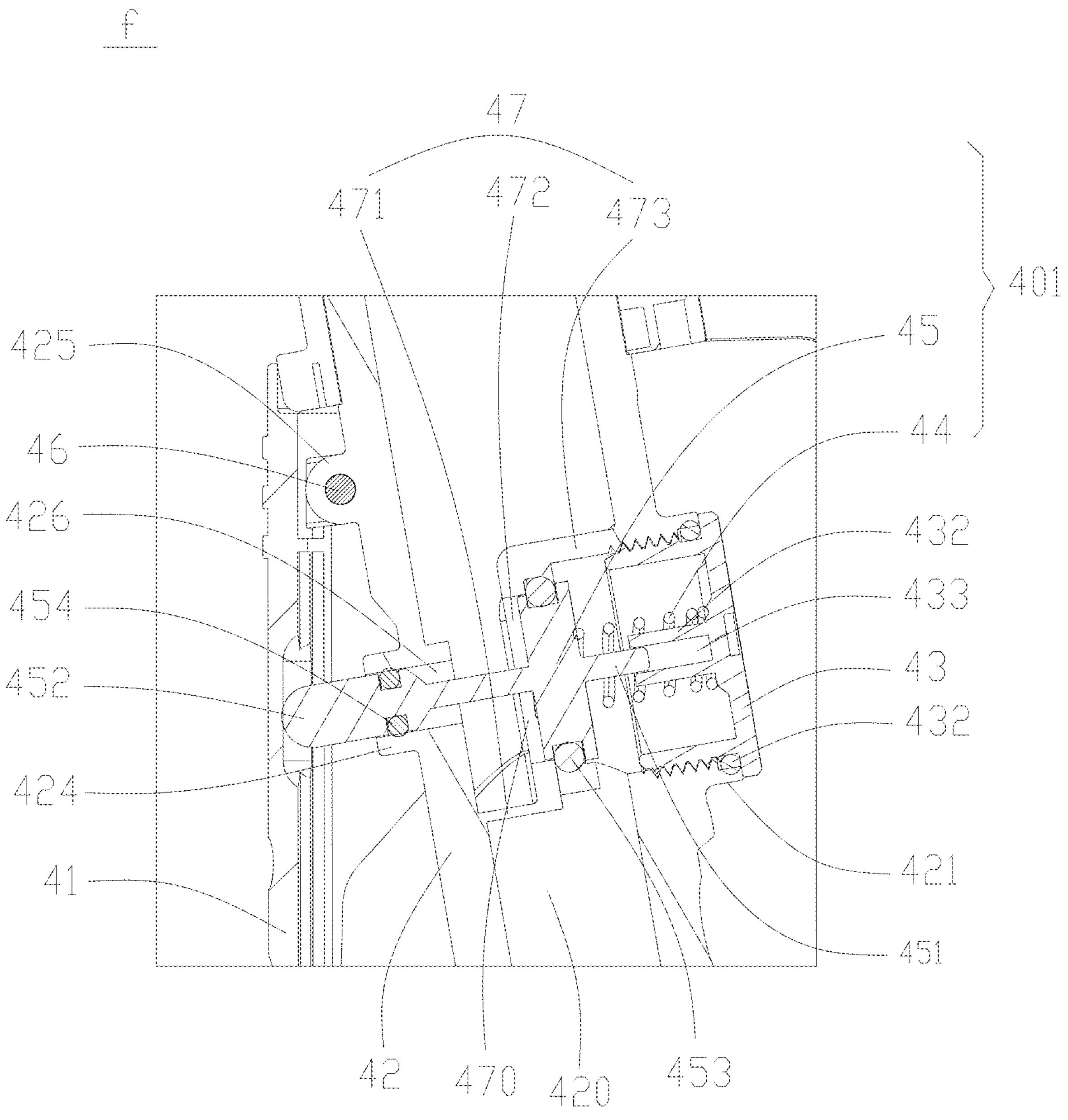
FIG. 20 is an enlarged schematic view of region fin FIG. 2.
Figure 21:
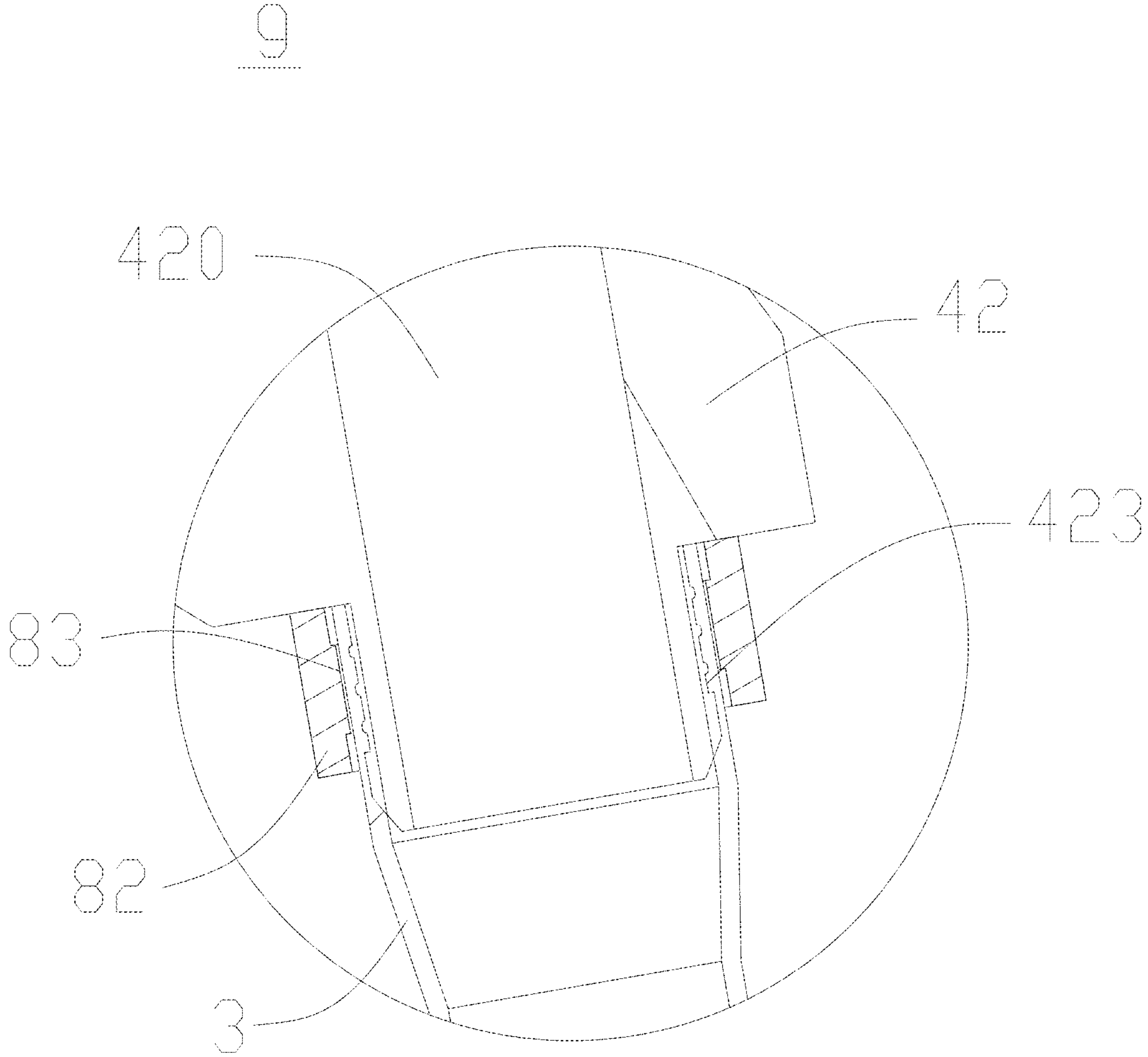
FIG. 21 is an enlarged schematic view of region g in FIG. 2.
Figure 22:
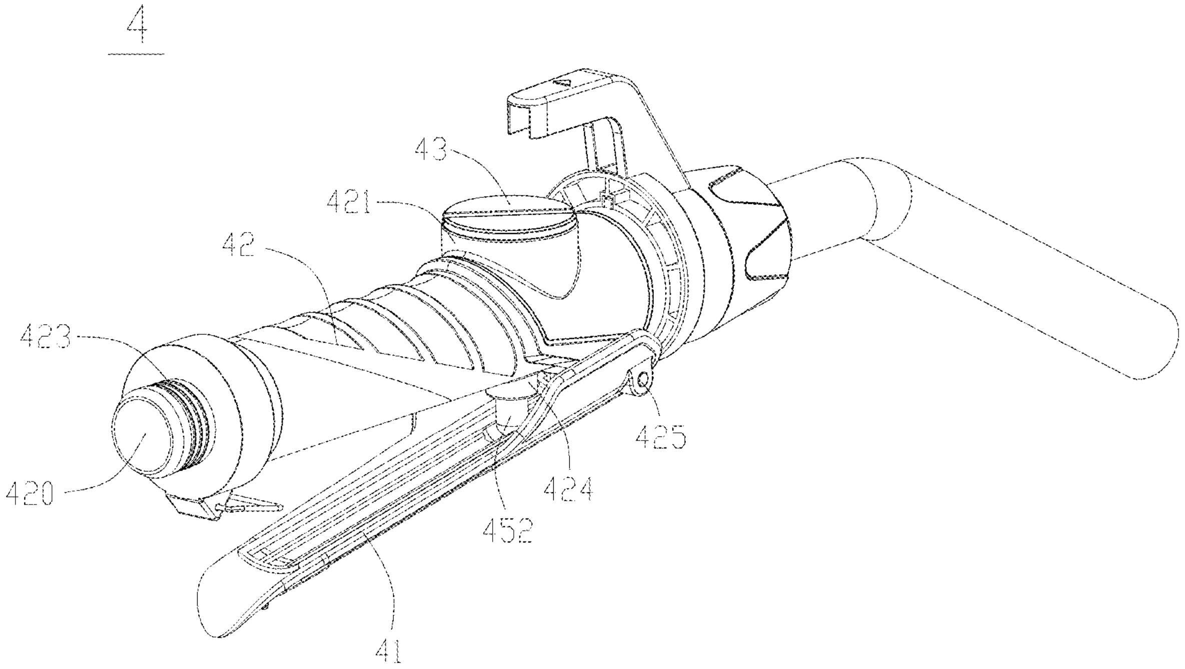
FIG. 22 is an isometric view of the control handle of the present invention.
Figure 23:
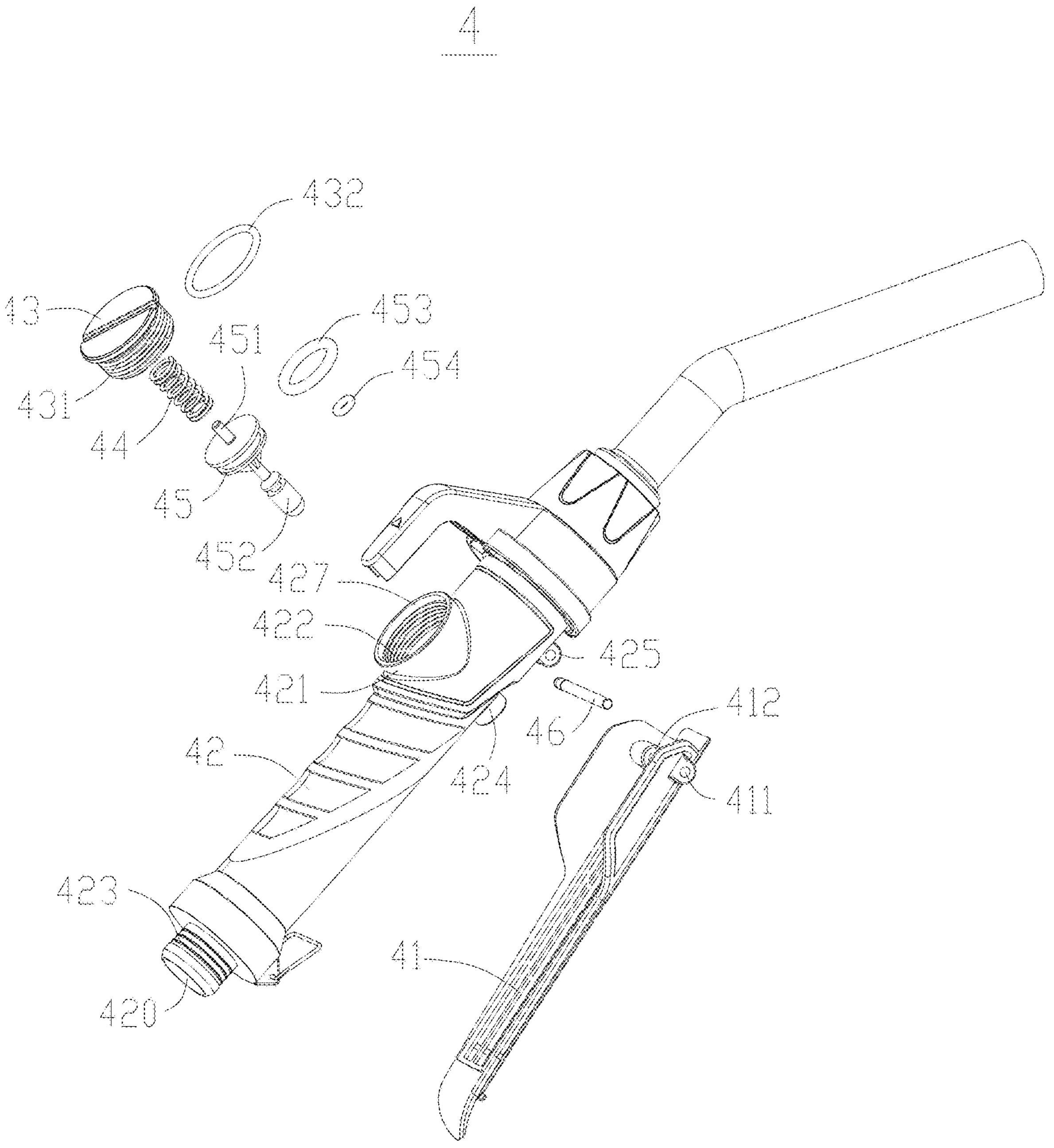
FIG. 23 is an exploded view of the control handle of the present invention.
Figure 24:
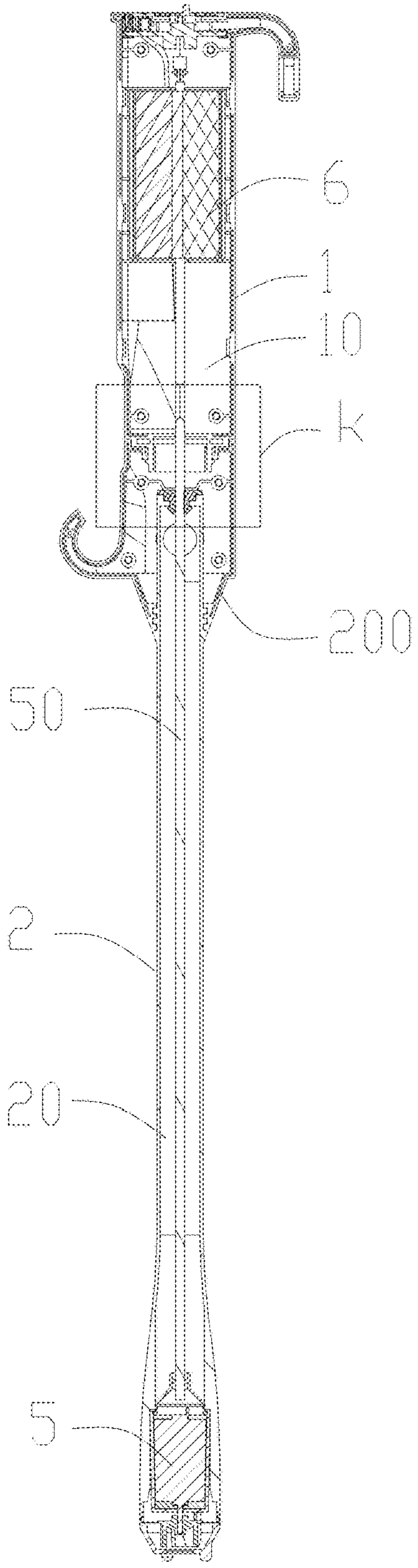
FIG. 24 is another cross-sectional view of another embodiment along the centerline of the oil extraction tube after removing the oil outlet tube and the control handle of the present invention.
Figure 25:
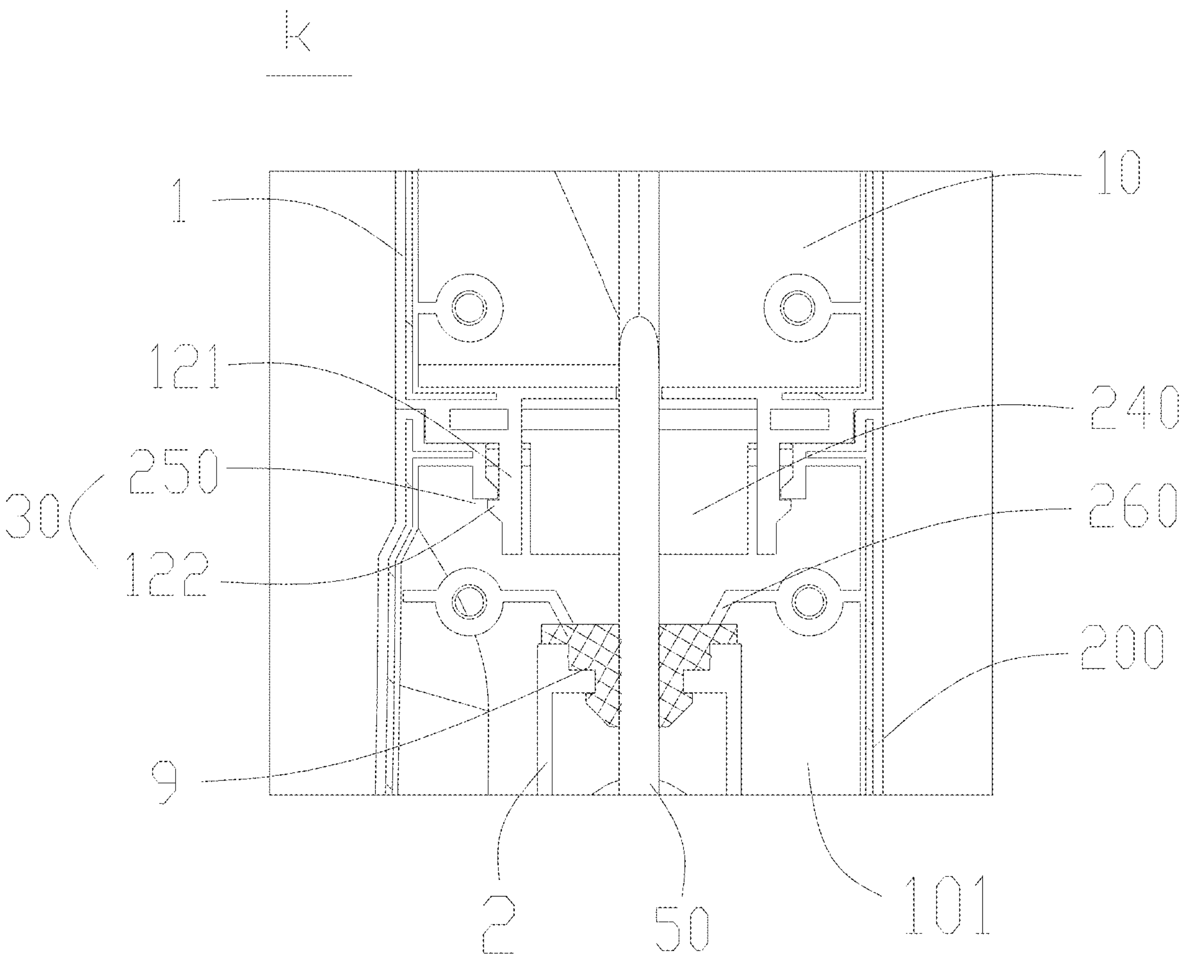
FIG. 25 is an enlarged schematic view of region k in FIG. 24.
Figure 26:
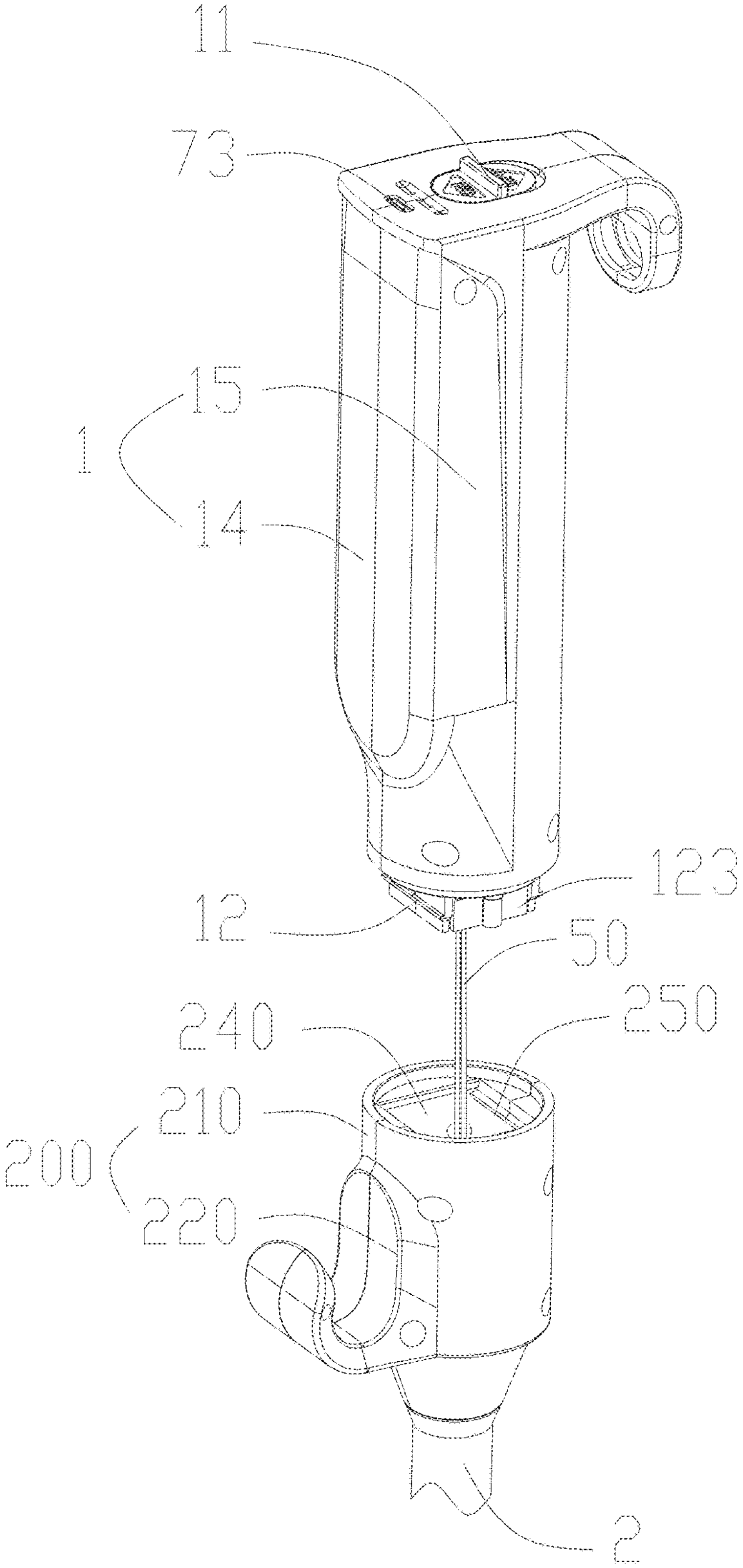
FIG. 26 is an exploded view of the mainframe with the adapter member and the oil extraction tube of the present invention.
Figure 27:
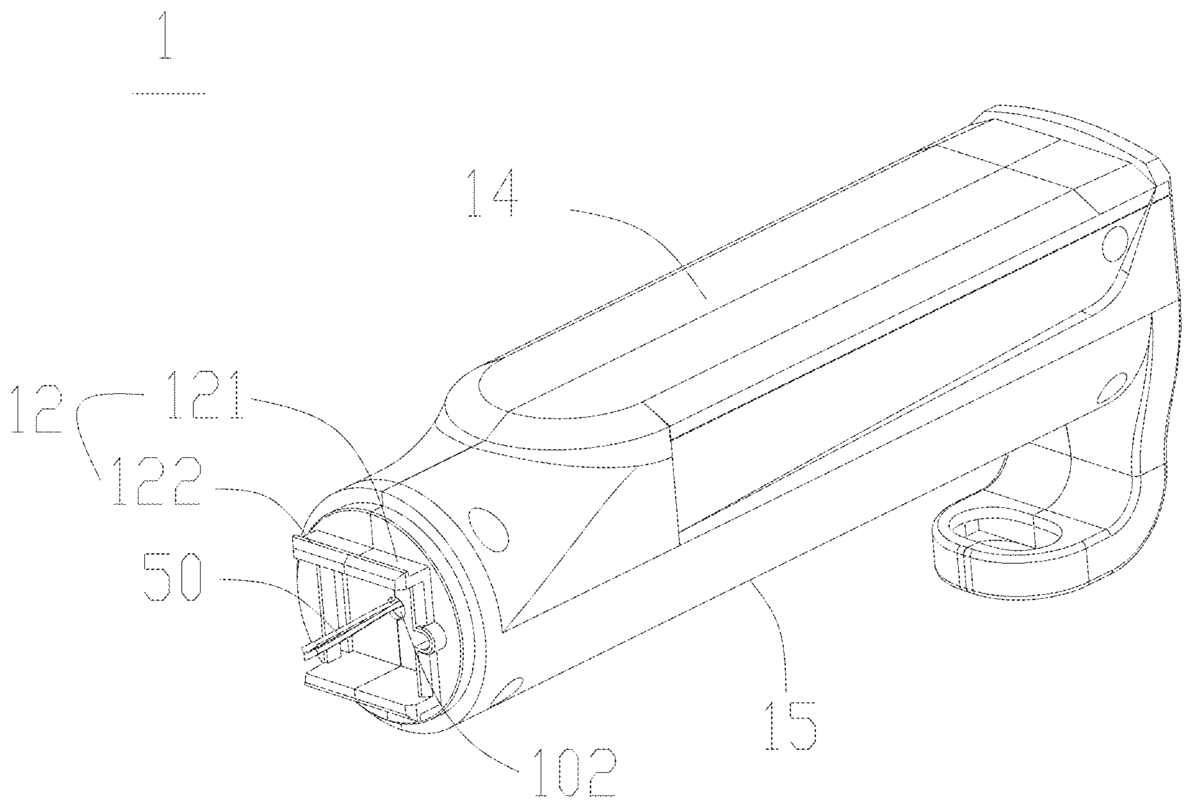
FIG. 27 is an isometric view of the mainframe of the present invention.

In this embodiment, the oil extraction tube 2 includes a tube body 23 having an oil extraction channel 20 and a first limiting cover 24 connected to the tube body 23, referring to FIG. 19. Specifically, the oil extraction channel 20 is connected with an interior of oil outlet tube 3. The tube body 23 and the first limiting cover 24 are connected by a structure such as a clamp, a thread, or a screw. The oil inlet 241 is provided on the first limiting cover 24 and connected with the oil extraction channel 20, the motor 53 works and drives the impeller 54 to rotate, the oil is discharged from the oil outlet tube 3 through the oil inlet 241 and the oil extraction channel 20 in sequence. In order to conveniently install the oilproof cover 57 in the second mounting cavity 205, the limiting ribs 203 are located on the tube body 23 and arranged close to one end of the first limiting cover 24.

Referring to FIG. 20 to FIG. 23, in this embodiment, a control handle 4 includes an oil passage tube 42 having an oil transfer channel 420, an operating member 41 detachably disposed on the oil passage tube 42 and a valve structure 40 connected to the operating member 41. The oil passage tube 42 is connected to an oil outlet end of the oil outlet tube 3. The valve structure 40 is at least partially disposed in the oil transfer channel 420. The valve structure 40 closes the oil transfer channel 420 in an initial state, the valve structure 40 opens the oil transfer channel 420 when the user operates the operating member 41.

In this embodiment, the control handle 4 is configured on the oil outlet tube 3, the operating member 41 and the valve structure 40 are arranged on the control handle 4. When the user turns on the pump body 5 to work, the valve structure 40 closes the oil transfer channel 420, no oil flows without operating the operating member 41, in other words, the oil outlet tube 3 does not discharge oil. When an oil tube needs to be discharged, the valve structure 40 opens the oil transfer channel 420 by operating the operating member 41, to cooperate with the pump body 5 discharging oil from the oil outlet tube 3, whereby the user can directly control the discharging oil from the oil outlet tube 3 through the control handle 4 on the outlet tube 3, which is convenient for the user to use, thereby avoiding the problem when the pump body 5 is working, the oil outlet tube 3 is not fixed, to causes shaking and oil spillage.

In this embodiment, the valve structure 40 includes a plunger 45 and a resilient member 44. The plunger 45 is at least partially disposed in the oil transfer channel 420. The two ends of the resilient member 44 are connected with the plunger 45 and an inner sidewall of the oil passage tube 42 respectively. The plunger 45 is connected with the operating member 41. When the operating member 41 is operated, the plunger 45 opens the oil transfer channel 420, to cooperate with the work of the pump body 5, thereby controlling the discharging oil from the oil outlet tube 3, and at the same time the resilient member 44 is in a compressed state. When the operating member is released, the plunger 45 is driven to return the initial position by rest force of the resilient member 44, in other words, the plunger 45 blocks the oil transfer channel 420, the oil transfer channel 420 is closed, to facilitate control the discharging oil by user during use. In another embodiment, the valve structure 40 doesn't include the resilient member 44. The user can operate the operating member 41 to drive the plunger 45 to reset, thereby restoring the plunger 45 to the initial position.

In this embodiment with the plunger 45 and the resilient member 44, the valve structure 40 further includes a second separator plate 47 arranged in the oil transfer channel 420. An oil passage hole 470 is provided on the second separator plate 47. The plunger closes the oil passage hole 470 in the initial state. When the operating member 41 is operated, the operating member 41 drives the plunger 45 moving to open the oil transfer channel 420. By using the second separator plate 47, the oil passage hole 470 is provided on the second separator plate 47, to adapt the plunger 45 and the resilient member 44, reducing the volume of the plunger 45. In another embodiment, the valve structure 40 doesn't include the second separator plate 47. The plunger 45 can cover a cross section of the oil transfer channel 420 in the initial state and close the oil transfer channel 420 in the initial state.

Specifically, the second separator plate 47 includes a first plate body 473, a second plate body 472 and a third plate body 471 connected in sequence from top to bottom. One end of the first plate body 473 and the third plate body 471 are both connected to an inner sidewall of oil passage tube 42. The oil passage hole 470 is provided on the second plate body 472. The plunger 45 is arranged at one side of the second plate body 472 opposite to the third plate body 471. Or, the plunger 45 is arranged at one side of the second plate body 472 opposite to the first plate body 473, thereby the plunger 45 matches with the oil passage hole 470 by using.

In this embodiment, the plunger 45 is arranged at one side of the second plate body 472 opposite to the third plate body 471. The second plate body 472 extends along a direction of the oil outlet. The plunger 45 is located on one side of the second plate body 472 opposite to the operating member 41. A first rod body 452 is provided on the plunger 45. The first rod body 452 passes through the oil passage hole 470 and the oil passage tube 42 in sequence and connects or abuts with the operating member 41. The resilient member 44 is located on one end of the plunger 45 opposite to the first rod body 452. When the user presses the operating member 41, the plunger 45 is driven and moved away from the operating member 41, to open the oil passage hole 470 and discharge oil from the oil outlet tube 3. Furthermore, the first plate body 473 and the third plate body 471 are both arranged vertically or at an angle with the second plate body 472. In another embodiment, the plunger 45 is arranged on one side of the second plate body 472 opposite to the first plate body 473. The first rod body 452 passes through the oil passage tube 42 and connects with the operating member 41. The resilient member 44 is located on one end of the plunger 45 close to the first rod body 452. When the user pulls the operating member 41 in a direction away from the second plate body 472, the oil passage hole 470 is opened, the resilient member 44 is compressed. When the user releases the operating member 41, the resilient member 44 drives the plunger 45 and the operating member 41 returning to the initial position.

In this embodiment, a sidewall close to the resilient member 44 of the oil passage tube 42 is provided with a mounting opening 427. The oil passage tube 42 is provided with a second limiting cover 43 at the mounting opening 427. The two ends of the resilient member 44 respectively contact with the second limiting cover 43 and the plunger 45. Thereby the plunger 45 and the resilient member 44 are installed in the oil transfer channel 420.

In this embodiment, the second limiting cover 43 is detachably connected with the oil passage tube 42. After the plunger 45 and the resilient member 44 are installed in the oil transfer channel 420, the second limiting cover 4 is installed.

Specifically, the oil passage tube 42 protrudes outward on the circumference side of the corresponding to the mounting opening 427 to form a second convex wall 421. A first thread 422 is provided on an inner sidewall of the second convex wall 421. A second thread 431 matching with the first thread 422 is provided on an outer sidewall of the second limiting cover 43. The second limiting cover 43 is detachably connected with the oil passage tube 42. A first rubber ring 432 is located between the second limiting cover 43 and the second convex wall 421, to prevent the oil from leaking from the mounting opening 427. In another embodiment, the second limiting cover 43 is removably detachably to the oil passage tube 42 by clamp, and the detachable structure is not limited herein.

In this embodiment, one end close to the resilient member 44 of the plunger is configured with a second rod body 451. One end close to the resilient member 44 of the second limiting cover 43 is provided with a first limiting column body 432. A first limiting hole 433 is provided on the first limiting column body 432. The second rod body 451 is at least partially placed in the first limiting hole 433 in the initial state. The resilient member 44 is a spring, the second rod body 451 and the first limiting column body 432 are disposed in the spring for limiting the spring. A length of the first limiting hole 433 is greater than a movement distance of the plunger 45, to avoid the movement of the plunger limited by the second rod body 451 and the first limiting hole 433. In another embodiment, the second limiting cover 43 and the plunger 45 are provided with a groove at the corresponding positions of the spring. The two ends of the spring are respectively placed in the grooves on the second limiting cover 43 and the plunger 45, thereby limiting the position of the spring. The resilient member 44 may not be the spring, the resilient member may be a resilient metal sheet which can be moved back and forth or folded.

In this embodiment, an outer sidewall of the plunger 45 is configured with a second rubber ring 453 sealing the oil passage hole in the initial state, to prevent the oil from leaking from the gap between the sealing hole and the plunger 45.

In this embodiment, one side of the oil passage tube 42 opposite to the second limiting cover 43 protrudes outward and forms with a second limiting column body 424. The second limiting column body 424 is provided with a second limiting hole 426. The first rod body 452 passes through the second limiting hole 426. A third rubber ring 454 is located between the first rod body 452 and the second limiting hole 426. A length of the second limiting hole 426 is greater than the movement distance of the plunger 45, to prevent the third rubber ring 454 from separating from the second limiting hole 426 and causing oil leaking when the plunger 45 drives the first rod body 452 moving.

In this embodiment, a shape of the operating member 41 is a long strip plate. The operating member 41 is rotatably connected to the oil passage tube 42 on one side of the first rod body 452, to be used for operating the operating member 41.

In this embodiment, the operating member 41 is rotatably connected to the oil passage tube 42 through a shaft rod 46. The oil passage tube 42 is provided with a rotation convex 425 on one side of the first rod body 452 opposite to the mainframe 1. A limiting groove 412 is provided on the operating member 41, two sides of the limiting groove 412 are provided with a shaft hole 411. The rotation convex 425 is located in the limiting groove 412. The shaft rod 46 passes through the shaft holes 411 and the rotation convex 425, to realize the rotation connection between the operating member 41 and the oil passage tube 42. When the user presses a position of the operating member 41 on one side of the first rod body 452 opposite to the rotation convex 425, the first rod body 452 drives the plunger 45 to move away from the operating member 41 and to open the oil passage hole 470, making the oil outlet tube 3 discharging oil.

In this embodiment, one end of the oil outlet tube 3 is sleeved on the oil passage tube 42. An outer sidewall oil outlet tube is sleeved with a second hold-down ring 83 at a position corresponding to the oil passage tube 42. The second hold-down ring 83 is configured to improve the stability of the connection between the oil outlet tube 3 and the oil passage tube 42.

Specifically, a plurality of second locking grooves 423 are provided on an outer sidewall of the oil passage tube 42. An inner wall of the second hold-down ring 82 is provided with a second hold-down convex 83 corresponding to the position of the second locking groove 423. The second hold-down convex 83 is connected with the outer sidewall of the oil outlet tube 3 through the interference fit, pressing a portion of the oil outlet tube 3 into the second locking groove 423, improving the stability of the connection between the oil outlet tube 3 and the oil passage tube 42.

Referring to FIG. 24 to FIG. 29, in this embodiment, an assembly structure 30 is configured between the oil extraction tube 2 and the mainframe 1. The oil extraction tube 2 is installed on the mainframe 1 through the assembly structure 30 under the operation. The mainframe 1 extends along a length of the oil extraction tube 2. The mainframe 1 is placed side by side with the oil extraction tube 2 in the transportation state.

By configuring the mainframe 1 and the oil extraction tube 2 as separate structure. When the product of this embodiment leaves the factory, the mainframe 1 and the oil extraction tube 2 are packaged and transported without assembling. The mainframe 1 and the oil extraction tube 2 are folded and placed side by side in a horizontal manner, shortening the length of the product packaging, reducing the volume of the product, reducing the transportation cost, and facilitating product transportation. Thereby solving the problem that the mainframe 1 and the oil extraction tube 2 of the existing portable oil extraction pump 100 are integrated when leaving the factory, resulting in a large transportation volume and high transportation cost. By configuring the assembly structure 30, the user can assemble the mainframe 1 and the oil extraction tube 2 together by himself after receiving the product, realizing the electrical connection between the pump body 5 and the circuit board 7.

Specifically, the oil extraction tube 2 and the mainframe 1 are detachably connected or non-detachably connected through the assembly structure 30.

In this embodiment, the assembly structure 30 includes a third fixture block 12 and a third fixture groove 250 matched with the third fixture block 12. When the oil extraction tube 2 is assembled with the mainframe 1, the third fixture block 12 is placed in the third fixture groove 250. By using the third fixture block 12 and the third fixture groove 250, the oil extraction tube 2 and the mainframe 1 are assembled after the product is delivered to the user, the structure is simple and convenient for the user to install. In another embodiment, the assembly structure 30 is a screw, the mainframe 1 and the oil extraction tube 2 are assembled by the screw, or the assembly structure 30 is a thread, the mainframe 1 and the oil extraction tube 2 are connected through the thread.

In this embodiment, the third fixture block 12 is configured on one side of the mainframe 1 close to the oil extraction tube 2. The portable oil extraction pump 100 further includes an adapter member 200 located between the mainframe 1 and the oil extraction tube 2. The mainframe 1 is connected with the oil extraction tube 2 through the adapter member 200. A third embedment groove 240 connected with the third fixture groove 250 is provided on the adapter member 200. The third fixture groove 250 is two and arranged on the two sidewalls of the third embedment groove 240. The third fixture block 12 includes a connection column 121 connected with the mainframe 1 and a clamping convex block 122 formed by the connection column 122 protruding outward. The third fixture block 12 is two and arranged at intervals. Two clamping convex blocks 122 on the third fixture block 12 are arranged in opposite directions. When the oil extraction tube 2 is assembled with the mainframe 1, the connection column 121 is placed in the third embedded groove 240. When the oil extraction tube 2 is assembled with the mainframe 1, the clamping convex block 122 is placed in the third fixture groove 250. By configuring the connection column 121 and the third embedment groove 240, the contact area between the adapter member 200 and the mainframe 1 can be increased, the stability of the connection between the mainframe 1 and the adapter member 200 can be improved. By configuring the connection column 121, when the clamping convex block 122 on two the third fixture block 12 are placed in the third fixture groove 250, which their relative positions have a certain change, the third embedment groove 240 can provide a space for the clamping convex block 122 on the two third fixture blocks 12 to avoid changes in their relative positions, thereby the clamping convex block 122 can be placed in the third fixture groove 250. In another embodiment, the number of the third fixture block 12 can be one, three, four, etc.

Specifically, the mainframe 1 is arranged with at least two reinforcement columns 123 at intervals between two reinforcement columns 123. When the oil extraction tube 2 is assembled with the mainframe 1, the reinforcement columns 123 are configured in the first embedded groove 240, an outer sidewall formed by the two reinforcement columns 123 and the two connection column3 121 fits with an inner sidewall of the first embedded groove 240, increasing the contact surface between the oil extraction tube 2 and the mainframe 1 during assembly, improving the stability of the connection between the mainframe 1 and the adapter member 200.

Furthermore, a cross section of the clamping convex block 122 is a right trapezoid, a right triangle. When the clamping convex block 122 is configured in the third fixture groove 250, which is difficult to disengage the clamping convex block 122 from the third fixture groove 250 by an external force, to realize that the mainframe 1 is not detachable after assembling with the adapter member 200. In another embodiment, the cross section of the clamping convex block 122 is an isosceles triangle, an isosceles trapezoid. The two opposite sidewalls of the clamping convex block 122 are an inclined surface, using the inclined surface as a guide, the clamping convex block 122 can be easily placed in the third fixture groove 250 by the external force, or the clamping convex block 122 can be detached from the fixture groove 250 to achieve a detachable connection between the mainframe 1 and the adapter member 200.

Specifically, in this embodiment with the adapter member 200, the avoidance hole 141 is provided on the adapter member 200. The adapter cavity 101 is provided on the adapter member 200. The first separator plate 260 is located between the adapter member 200 and the third embedment groove 240. The first routing hole 102 is provided on one side of the first separator plate 260 opposite to the oil extraction tube 2. The wire passes through the oil extraction tube 2, the adapter cavity 101, the first separator plate 260, and enters the control cavity 10 through the third embedment groove 240 and the first routing hole 102, and electrically connects with the circuit board 7. When the mainframe 1 and the adapter member 200 are assembled, the third embedment groove 240 can accommodate the wires 50. The junction structure 230 is located between the mainframe 1 and adapter member 200, By using the junction structure 230, the oil extraction tube 2 is assembled to the mainframe 1 through the adapter member 200.

Figure 28:
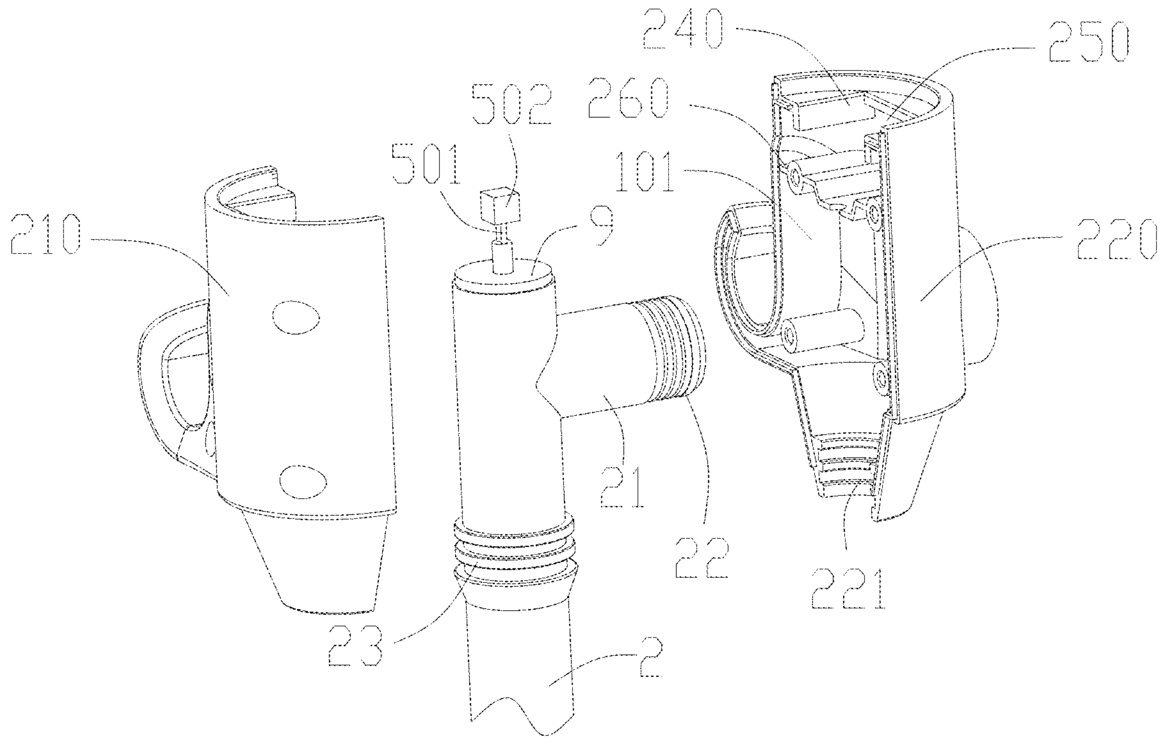
FIG. 28 is an exploded view of the adapter member and the oil extraction tube of the present invention.
Figure 29:
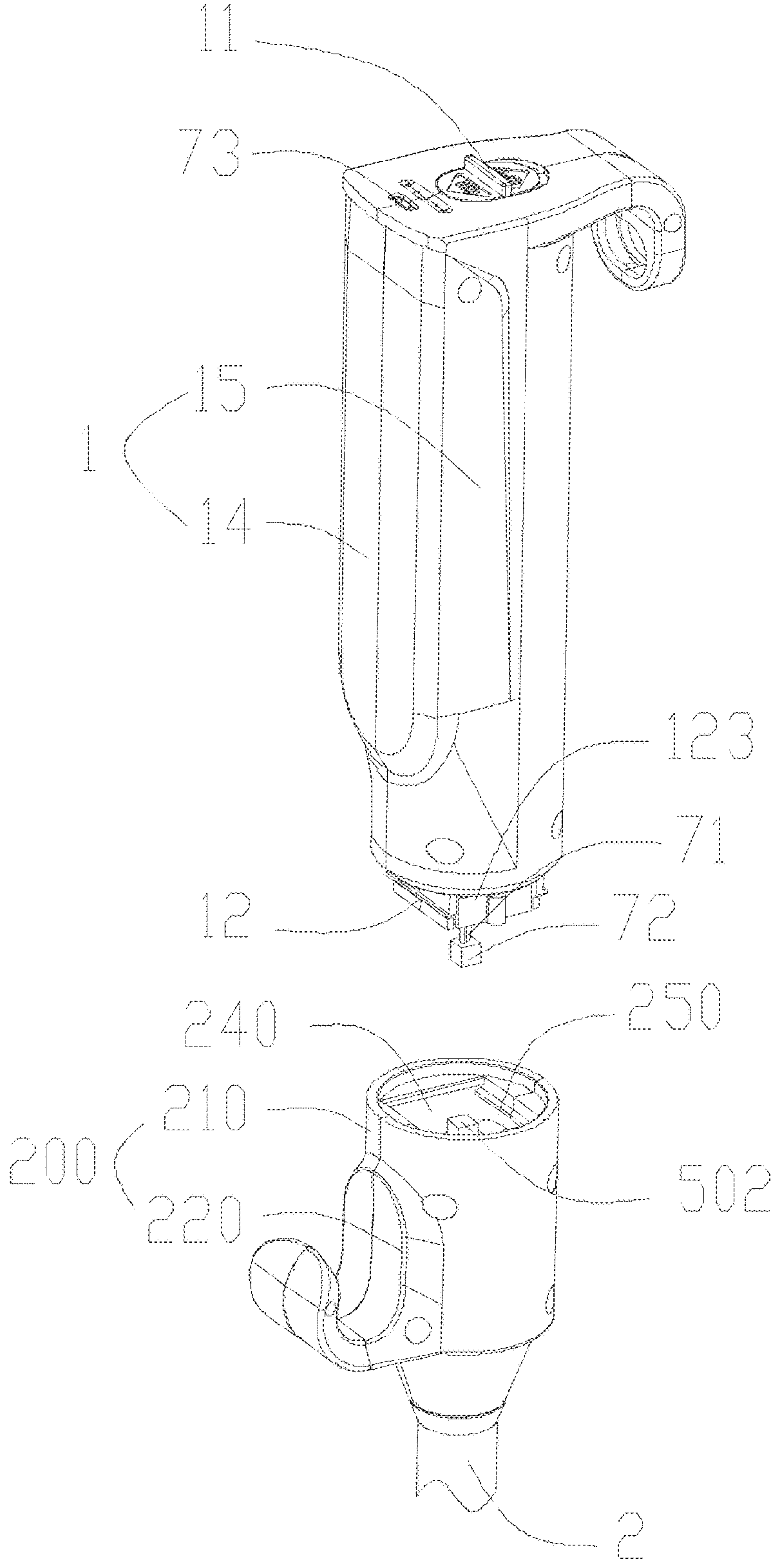
FIG. 29 is an exploded view of the mainframe electrically connected with the oil extraction tube through a first connection terminal and a second connection terminal of the present invention.

In another embodiment, referring to FIG. 28 and FIG. 29, the mainframe 1 is configured with a first connection terminal 72 electrically connected with the circuit board 7. The oil extraction tube 2 is configured with a second connection terminal 502 electrically connected with the pump body 5. When oil extraction tube 2 is assembled to the mainframe 1, the first connection terminal 72 electrically connected with the second connection terminal 502. When leaving the factory, the mainframe 1 and the oil extraction tube 2 can be folded to reduce the volume of the packaging. With the assembly structure 30, after receiving the product, the user assembles the oil extraction tube 2 and the mainframe 1 together, and electrically connects the first connection terminal 72 and the second connection terminal 502, to realize the electrical connection between the pump body 5 and the circuit board 7.

Specifically, the first connection terminal 72 and the second connection terminal 502 are contact points, one of them is a conductive column and another is an elastic probe. Alternatively, the first connection terminal 72 and the second connection terminal 502 are a contact point and a conductive spring respectively. Furthermore, the first connection terminal 72 and the second connection terminal 502 are a male connector and a female connector matched with the male connector respectively.

In this embodiment with the first connection terminal 72 and the second connection terminal 502, the first connection terminal 72 is disposed on an outer side of the mainframe 1. The first connection terminal 72 is located close to the third fixture block 12.

The wire 50 includes a first conductive wire 71 and a second conductive wire 501. The first connection terminal 72 is connected to the circuit board 7 through the first conductive wire 71, the first conductive wire 71 passes through the first routing hole 102. The second connection terminal 502 is electrically connected to the pump body 5 through the second conductive wire 501, the second conductive wire 501 passes through the second routing hole 25 and the first separator plate 260. In this embodiment, the first connection terminal 72 and the second connection terminal 502 are the male connector and the female connector matched with the male connector respectively. After receiving the product, the users connect the first connection terminal 72 with the second connection terminal 502, and assemble the mainframe 1 on the adapter member 200. At this time, the first embedment groove 232 can be configured to receive the first connection terminal 72 and the second connection terminal 502.

In this embodiment, the adapter member 200 includes a first adapter housing 210 and a second adapter housing. The first adapter housing 210 is connected with a second adapter housing 220 to form the adapter cavity 101 and the first separator plate 260. The embedment convex block 231 is configured on the first adapter housing 210 and/or the second adapter housing 220. The number of the embedment convex blocks 231 is multiple. The first adapter housing 210 is connected with a second adapter housing 220 to fix the oil extraction tube with the adapter member 200. In another embodiment, the first adapter housing 210 and the second adapter housing 220 may be connected by a screw, a clasp, or an ultrasonic pressing.

In this embodiment, the mainframe 1 is configured with a function switch 11 connected to the circuit board 7 on an end surface opposite the oil extraction tube 2, when the mainframe 1 is used as a user's handle, to avoid the function switch 11 from affecting the user's holding of the mainframe 1. When the user operates the function switch 11, the startup and the shutdown of the pump body 5 can be controlled through the circuit board 7, to control oil pumping.

In this embodiment, the mainframe 1 is configured with a power interface 73 connecting an external power. The power interface 73 is electrically connected to the circuit board 7, the battery 6 is a rechargeable battery. When the power interface 73 is connected to the external power, the battery 6 can be charged through the circuit board 7, to increase the service life of the portable oil extraction pump 100 of this embodiment 100.

In this embodiment, the battery 6 is a dry battery. The mainframe 1 is configured with a detachable battery cover corresponding to the dry battery, when the battery 6 is out of power, the battery cover can be removed to facilitate the user to replace the battery 6. Specifically, in this embodiment, the number of the battery 6 is two, the batteries are arranged in sequence along the direction opposite to the oil extraction tube 2. In this state, a height of the mainframe 1 is higher. The mainframe 1 and the oil extraction tube 2 are assembled integrally, an outer sidewall of the mainframe 1 is convenient for the user to hold, the user can plug the oil extraction tube 2 into the oil barrel. By the mainframe 1, to facilitate the user to take the product. In another embodiment, the number of dry batteries is one, three, four, etc. When the number of the dry battery is multiple, the dry batteries are arranged side by side.

In this embodiment, the mainframe 1 includes a first housing body 14 and a second housing body 15 connected to the first housing body 14 to form a control cavity 10 and a first routing hole 102. By dividing the mainframe 1 into the first housing body 14 and the second housing body 15 is beneficial to the production and manufacturing of the mainframe 1, which is convenient production and manufacture of the mainframe 1 and facilitates the placement of the circuit board 7 and the battery 6 in the control cavity 10. Specifically, the first housing body 14 and the second housing body 15 are connected by a clamp, screw, ultrasonic pressing, etc.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present invention are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:

1. A portable oil extraction pump, comprising:

a mainframe comprising a control cavity and a first routing hole connected to the control cavity, the portable oil extraction pump further comprising a circuit board and a battery electrically connected to the circuit board, the circuit board and the battery being configured in the control cavity;

an oil extraction tube connected to the mainframe;

a pump body configured in the oil extraction tube; and an oil outlet tube;

wherein the pump body is connected to the circuit board through a wire, a first sealing member is configured between the oil extraction tube and the mainframe to prevent an oil from entering the control cavity, the material of the first sealing member is a rubber, the wire passes through the first sealing member and the first routing hole and is electrically connected to the circuit board, the wire is connected with the first sealing member and/or the first routing hole through an interference fit;

the oil outlet tube is connected with the oil extraction tube, when the pump body is driven, the oil is pumped through the oil extraction tube and output through the oil outlet tube;

wherein the first sealing member comprises a first embedment block and a limiting block formed by extending outward from the first embedment block;

one end close to the circuit board of the oil extraction tube is provided with a first embedment groove, the oil extraction tube is provided with a second routing hole which is connected to an inside of the oil extraction tube and the first embedment groove respectively, the limiting block is located between the oil extraction tube and the mainframe, the first embedment block is disposed in the first embedment groove, and the wire passes through the second routing hole, the first embedment block and the limiting block.

2. The portable oil extraction pump according to claim 1, wherein the first sealing member further comprises a second embedment block, the second embedment block is connected to a surface of the first embedment block opposite to the limiting block;

the second embedment block is disposed in the second routing hole, the wire passes through the second embedment block;

the wire is connected with one or more of the second embedment block, the first embedment block and the limit block through the interference fit;

an inner sidewall of the oil extraction tube is provided with a partition convex block, the second routing hole is disposed on the partition convex block, one end of the second embedment block is provided with a first fixture block opposite to the first embedment block;

a first fixture groove is provided among the first fixture block, the first embedment block and the second embedment block, the partition convex block is disposed in the first fixture groove;

and the cross sections of the second embedment block, the first embedment block and the limiting block decrease in sequence.

3. The portable oil extraction pump according to claim 1, wherein the pump body comprises an oilproof cover, a motor and an impeller arranged in the oil extraction tube, an oil passage channel for oil passing is formed between the oilproof cover and the inner sidewall of the oil extraction tube, the motor is arranged in the oilproof cover, a rotary shaft of the motor passes through from the inside of the oilproof cover and connects to the impeller, the impeller is located close to one side of the oil extraction tube opposite to the mainframe;

the motor is electrically connected to the circuit board through the wire, one end of the wire passes into the oilproof cover from the inside of the oil extraction tube and is electrically connected to the motor, another end of the wire passes into the mainframe from the inside of the oil extraction tube and is electrically connected to the circuit board;

a sealing gasket is located between a side close to the impeller of the motor and the oilproof cover, the rotary shaft of the motor passes through the sealing gasket;

a first glue layer is arranged in the oilproof cover, the first glue layer covers at the electrical connection between the wire and the motor, and/or the wire is connected with the oilproof cover through the interference fit.

4. The portable oil extraction pump according to claim 3, wherein a third routing hole is provided on the oilproof cover, the wire passes through the third routing hole;

the oilproof cover comprises a housing and a housing cover connected to the housing to form a first mounting cavity, the motor and the sealing gasket are arranged in the first mounting cavity;

the housing cover is located on a top of housing, the sealing gasket is located on one side of the motor opposite to the housing cover, the rotary shaft of the motor passes through the housing, the third routing hole is provided on the housing cover;

or the housing cover is located on or close to a bottom of the housing, the sealing gasket is located on one side of the motor close to the housing cover, the rotary shaft of the motor passes through the housing cover, and third routing hole is provided on the housing.

5. The portable oil extraction pump according to claim 4, wherein an annular groove is provided on an inner sidewall of the housing, the housing cover extends outward to form an annular convex block matching with the annular groove, and the annular convex block is placed in the annular groove.

6. The portable oil extraction pump according to claim 5, wherein the housing cover is connected with the housing further forming a first glue-filled groove, the first glue-filled groove is disposed at one side of the annular convex block opposite to the first mounting cavity, the first glue-filled groove is configured to fill with a second glue layer;

the housing cover protrudes outward at the position corresponding to the wire to form a glue-filled convex, the third routing hole passes through the glue-filled convex, one side of the glue-filled convex opposite to the first mounting cavity is provided with a second glue-filled groove connected with the third routing hole, and the second glue-filled groove is configured to fill with a third glue layer.

7. The portable oil extraction pump according to claim 4, wherein when the housing cover is located on or close to the bottom of the housing, the oilproof cover further comprises a second sealing member;

a top of the housing comprises a first convex wall and a receiving groove located in the first convex wall, the third routing hole is connected with the receiving groove, the housing comprises a second fixture block located between the receiving groove and the first mounting cavity, an outer sidewall of the second sealing member is provided with a second fixture groove, the second sealing member passes through the third routing hole, the second fixture block is disposed in the second fixture groove, a portion of the second sealing member is disposed in the receiving groove, the wire passes through the second sealing member through the interference fit, and the second sealing member is connected with one or more of a sidewall of the receiving groove and a sidewall of the third routing hole through the interference fit.

8. The portable oil extraction pump according to claim 3, wherein the inner sidewall of the oil extraction tube protrudes and forms at least two limiting ribs arranged at intervals, the oilproof waterproof cover is connected with the limiting ribs through interference fit;

an oil passage channel is formed among the oilproof cover, the limiting ribs and the inner sidewall of the oil extraction tube;

each of limiting ribs comprises a first convex stripe and a second convex stripe connected with the first convex stripe, the second convex stripe and the first convex stripe are stepped, the second convex stripe is located below the first convex stripe, a plurality of the second convex stripes are arranged around to form a second mounting cavity, the oilproof cover is placed in the second mounting cavity;

the oil extraction tube comprises a tube body comprising an oil extraction channel and a first limiting cover connected to the tube body;

an oil inlet is provided on the first limiting cover and connected with the oil extraction channel, and the limiting ribs are located on the tube body and arranged close to one end of the first limiting cover.

9. The portable oil extraction pump according to claim 1, wherein an assembly structure is configured between the oil extraction tube and the mainframe;

the oil extraction tube is installed on the mainframe through the assembly structure under the operation of the user, the mainframe extends along a length of the oil extraction tube;

the mainframe is placed side by side with the oil extraction tube in the transportation state.

10. The portable oil extraction pump according to claim 9, wherein the assembly structure comprises a third fixture block and a third fixture groove matched with the third fixture block, when the oil extraction tube is assembled with the mainframe, the third fixture block is placed in the third fixture groove.

11. The portable oil extraction pump according to claim 10, further comprising an adapter member located between the mainframe and the oil extraction tube, the third fixture groove is provided on the adapter member, a third embedment groove connected with the third fixture groove is provided on the adapter member;

the third fixture groove is two and arranged on the two sidewalls of the third embedment groove;

the third fixture block comprises a connection column connected with the mainframe and a clamping convex block formed by the connection column protruding outward;

the third fixture block is two and arranged at intervals;

the two clamping convex blocks on the third fixture block are arranged in opposite directions;

when the oil extraction tube is assembled with the mainframe, the connection column is placed in the third embedded groove, and when the oil extraction tube is assembled with the mainframe the clamping convex block is placed in the third fixture groove.

12. A portable oil extraction pump, comprising:

a mainframe comprising a control cavity and a first routing hole connected to the control cavity, the portable oil extraction pump further comprising a circuit board and a battery electrically connected to the circuit board, the circuit board and the battery being configured in the control cavity;

an oil extraction tube connected to the mainframe;

a pump body configured in the oil extraction tube; and an oil outlet tube;

wherein the pump body is connected to the circuit board through a wire, a first sealing member is configured between the oil extraction tube and the mainframe to prevent an oil from entering the control cavity, the material of the first sealing member is a rubber, the wire passes through the first sealing member and the first routing hole and is electrically connected to the circuit board, the wire is connected with the first sealing member and/or the first routing hole through an interference fit;

the oil outlet tube is connected with the oil extraction tube, when the pump body is driven, the oil is pumped through the oil extraction tube and output through the oil outlet tube;

wherein the mainframe further comprises an adapter cavity, one end of the oil extraction tube is placed in the adapter cavity, the mainframe is configured with a first separator plate between the adapter cavity and the control cavity, the first sealing member is at least partially located between the first separator plate and the oil extraction tube;

the first routing hole is provided on the first separator plate, or the first routing hole is disposed on one side of the first separator plate opposite to the oil extraction tube, the wire passes through the first separator plate;

a junction structure is located between the mainframe and the oil extraction tube, the junction structure is disposed at one end of the adapter cavity opposite to the control cavity;

the junction structure comprises at least one embedment convex block and a second embedment groove matching with the embedment convex block, and the embedment convex block is disposed in the second embedment groove.

13. The portable oil extraction pump according to claim 12, wherein the embedment convex block is disposed on the mainframe, the second embedment groove is disposed on the oil extraction tube, and the number of the embedment convex blocks and the second embedment grooves is multiple.

14. The portable oil extraction pump according to claim 12, wherein a sidewall close to the circuit board of the oil extraction tube protrudes to form a connection tube, an avoidance hole is provided on the mainframe and connected to the adapter cavity, the connection tube passes through the avoidance hole;

one end of the oil outlet tube is sleeved on an outer side of the connection tube and tightened through the first hold-down ring;

an outer sidewall of the connection tube is provided with a first locking groove, an inner sidewall of the first hold-down ring is provided with a first hold-down convex corresponding to the position of the first locking groove, and the first hold-down convex is connected with an outer sidewall of the oil outlet tube through the interference fit.

15. A portable oil extraction pump, comprising:

a mainframe comprising a control cavity and a first routing hole connected to the control cavity, the portable oil extraction pump further comprising a circuit board and a battery electrically connected to the circuit board, the circuit board and the battery being configured in the control cavity;

an oil extraction tube connected to the mainframe;

a pump body configured in the oil extraction tube; and an oil outlet tube;

wherein the pump body is connected to the circuit board through a wire, a first sealing member is configured between the oil extraction tube and the mainframe to prevent an oil from entering the control cavity, the material of the first sealing member is a rubber, the wire passes through the first sealing member and the first routing hole and is electrically connected to the circuit board, the wire is connected with the first sealing member and/or the first routing hole through an interference fit;

the oil outlet tube is connected with the oil extraction tube, when the pump body is driven, the oil is pumped through the oil extraction tube and output through the oil outlet tube;

wherein the further portable oil extraction pump comprises a control handle, wherein the control handle comprises an oil passage tube having an oil transfer channel, an operating member detachably disposed on the oil passage tube and a valve structure connected to the operating member;

the oil passage tube is disposed at the end of the oil outlet tube opposite to the oil extraction tube, the valve structure is at least partially disposed in the oil transfer channel, the valve structure closes the oil transfer channel in an initial state, and the valve structure opens the oil transfer channel when the user operates the operating member;

wherein the valve structure comprises a plunger and a resilient member, the plunger is at least partially disposed in the oil transfer channel, the two ends of the resilient member are connected with the plunger and an inner sidewall of the oil passage tube respectively, the plunger is connected with the operating member, when the operating member is operated, the plunger opens the oil transfer channel, when the operating member is released, the resilient member drives the plunger to return the initial position;

wherein a sidewall close to the resilient member of the oil passage tube is provided with a mounting opening, the oil passage tube is provided with a second limiting cover at the mounting opening, and the two ends of the resilient member respectively contact with the second limiting cover and the plunger.

16. The portable oil extraction pump according to claim 15, wherein the second limiting cover is detachably connected with the oil passage tube;

the oil passage tube protrudes outward on the circumference side of the corresponding to the mounting opening to form a second convex wall, a first thread is provided on an inner sidewall of the second convex wall, a second thread matching with the first thread is provided on an outer sidewall of the second limiting cover, and a first rubber ring is located between the second limiting cover and the second convex wall.

17. The portable oil extraction pump according to claim 15, wherein the valve structure further comprises a second separator plate arranged in the oil transfer channel, an oil passage hole is provided on the second separator plate, the plunger closes the oil passage hole in the initial state;

the second separator plate comprises a first plate body, a second plate body and a third plate body connected in sequence from top to bottom, one end of the first plate body and the third plate body are both connected to an inner sidewall of oil passage tube, the oil passage hole is provided on the second plate body;

the second plate body extends along a direction of the oil outlet, the plunger is located on one side of the second plate body opposite to the operating member;

a first rod body is provided on the plunger, the first rod body passes through the oil passage hole and the oil passage tube in sequence and connects or abuts with the operating member, the resilient member is located on one end of the plunger opposite to the first rod body;

a shape of the operating member is a long strip plate, and the operating member is rotatably connected to the oil passage tube on one side of the first rod body.

* * * * *